(12) United States Patent
O'Meara et al.

(10) Patent No.: US 12,008,526 B2
(45) Date of Patent: Jun. 11, 2024

(54) COMPUTER SYSTEM AND METHOD FOR PROGRAMMATIC COLLATERALIZATION SERVICES

(71) Applicant: Inveniam Capital Partners, Inc., New York, NY (US)

(72) Inventors: Patrick D. O'Meara, Northville, MI (US); Richard Gates Bunker, Jr., Jenkintown, PA (US); Quentin Vidal, Brooklyn, NY (US); Scott Jason Landers, Madison Heights, MI (US); Jeannette L. Spaulding, Miami, FL (US); Kevin M. Cuddeback, Medford, MA (US); Sanjay Vatsa, Manalapan, NJ (US); David Todd Stevens, Short Hills, NJ (US); Michael Carlo Creadon, Chicago, IL (US); Christos Alkiviadis Polyzois, Bloomington, MN (US)

(73) Assignee: Inveniam Capital Partners, Inc., New York, NY (US)

( * ) Notice: Subject to any disclaimer, the term of this patent is extended or adjusted under 35 U.S.C. 154(b) by 0 days.

(21) Appl. No.: 17/705,289

(22) Filed: Mar. 26, 2022

(65) Prior Publication Data
US 2022/0309479 A1    Sep. 29, 2022

Related U.S. Application Data

(60) Provisional application No. 63/224,431, filed on Jul. 22, 2021, provisional application No. 63/170,006, (Continued)

(51) Int. Cl.
*G06Q 20/06*    (2012.01)
*G06Q 40/03*    (2023.01)

(52) U.S. Cl.
CPC ......... *G06Q 20/0658* (2013.01); *G06Q 40/03* (2023.01)

(58) Field of Classification Search
CPC ............................ G06Q 20/0658; G06Q 40/03
See application file for complete search history.

(56) References Cited

U.S. PATENT DOCUMENTS

| 4,309,569 A | 1/1982 | Merkle |
| 5,499,294 A | 3/1996 | Friedman |

(Continued)

FOREIGN PATENT DOCUMENTS

| CN | 107392618 A | 11/2017 |
| CN | 110392052 A | 10/2019 |

(Continued)

OTHER PUBLICATIONS

M. Nandi, R. K. Bhattacharjee, A. Jha and F. A. Barbhuiya, "A secured land registration framework on Blockchain," 2020 Third ISEA Conference on Security and Privacy (ISEA-ISAP), Guwahati, India, 2020, pp. 130-138, doi: 10.1109/ISEA-ISAP49340.2020. 235011 (Year: 2020).*

(Continued)

*Primary Examiner* — Elizabeth H Rosen
(74) *Attorney, Agent, or Firm* — Koffsky Schwalb LLC

(57) ABSTRACT

A computer system processes a digital representation of an illiquid asset, to confirm accuracy of the digital representation and value of the asset, and generates an asset-information table indicating where the various sections of the digital representation are stored. The system also generates an asset-value token, financial-return tokens, and a data structure that includes a self-executing program. The program associates the asset-value token with the financial-return tokens, so that the illiquid asset becomes a collateral for a decentralized loan transaction implemented using block- (Continued)

chain technology. The use of blockchain technology for decentralized loan transactions enables immutable data traceability.

23 Claims, 9 Drawing Sheets

Related U.S. Application Data filed on Apr. 2, 2021, provisional application No. 63/166,344, filed on Mar. 26, 2021.

(56) References Cited

U.S. PATENT DOCUMENTS

| | | |
|---|---|---|
| 5,606,609 A | 2/1997 | Houser |
| 5,862,218 A | 1/1999 | Steinberg |
| 5,920,629 A | 7/1999 | Rosen |
| 5,966,446 A | 10/1999 | Davis |
| 6,363,481 B1 | 3/2002 | Hardjono |
| 7,028,263 B2 | 4/2006 | Maguire |
| 7,212,808 B2 | 5/2007 | Engstrom |
| 7,272,179 B2 | 9/2007 | Siemens |
| 7,572,179 B2 | 8/2009 | Choi |
| 7,729,950 B2 | 6/2010 | Mendizabal |
| 7,730,113 B1 | 6/2010 | Payette |
| 8,245,038 B2 | 8/2012 | Golle |
| 8,266,439 B2 | 9/2012 | Haber |
| 8,359,361 B2 | 1/2013 | Thornton |
| 8,442,903 B2 | 5/2013 | Zadoorian |
| 8,560,722 B2 | 10/2013 | Gates |
| 8,612,477 B2 | 12/2013 | Becker |
| 8,706,616 B1 | 4/2014 | Flynn |
| 8,712,887 B2 | 4/2014 | Degroeve |
| 8,867,741 B2 | 10/2014 | Mccorkindale |
| 8,943,332 B2 | 1/2015 | Horne |
| 8,990,322 B2 | 3/2015 | Cai |
| 9,124,423 B2 | 9/2015 | Jennas, II |
| 9,378,343 B1 | 6/2016 | David |
| 9,396,006 B2 | 7/2016 | Kundu |
| 9,398,018 B2 | 7/2016 | Macgregor |
| 9,407,431 B2 | 8/2016 | Bellare |
| 9,411,524 B2 | 8/2016 | O'Hare |
| 9,411,976 B2 | 8/2016 | Irvine |
| 9,411,982 B1 | 8/2016 | Dippenaar |
| 9,424,576 B2 | 8/2016 | Vandervort |
| 9,436,923 B1 | 9/2016 | Sriram |
| 9,436,935 B2 | 9/2016 | Hudon |
| 9,472,069 B2 | 10/2016 | Roskowski |
| 9,489,827 B2 | 11/2016 | Quinn |
| 9,584,493 B1 | 2/2017 | Leavy |
| 9,588,790 B1 | 3/2017 | Wagner |
| 9,647,977 B2 | 5/2017 | Levasseur |
| 9,722,790 B2 | 8/2017 | Ebrahimi |
| 9,818,109 B2 | 11/2017 | Loh |
| 9,830,580 B2 | 11/2017 | Macgregor |
| 9,875,510 B1 | 1/2018 | Kasper |
| 9,876,646 B2 | 1/2018 | Ebrahimi |
| 9,882,918 B1 | 1/2018 | Ford |
| 10,025,941 B1 | 7/2018 | Griffin |
| 10,046,228 B2 | 8/2018 | Tran |
| 10,102,265 B1 | 10/2018 | Madisetti |
| 10,102,526 B1 | 10/2018 | Madisetti |
| 10,108,954 B2 | 10/2018 | Dunlevy |
| 10,135,607 B1 | 11/2018 | Roets |
| 10,163,080 B2 | 12/2018 | Chow |
| 10,270,599 B2 | 4/2019 | Nadeau |
| 10,346,815 B2 | 7/2019 | Glover |
| 10,355,869 B2 | 7/2019 | Bisti |
| 10,366,204 B2 | 7/2019 | Tanner, Jr. |
| 10,373,129 B1 | 8/2019 | James |
| 10,411,897 B2 | 9/2019 | Paolini-Subramanya |
| 10,419,225 B2 | 9/2019 | Deery |
| 10,438,285 B1 | 10/2019 | Konstantinides |
| 10,476,847 B1 | 11/2019 | Smith |
| 10,532,268 B2 | 1/2020 | Tran |
| 10,586,270 B2 | 3/2020 | Reddy |
| 10,628,268 B1 | 4/2020 | Baruch |
| 10,685,399 B2 | 6/2020 | Snow |
| 10,693,652 B2 | 6/2020 | Nadeau |
| 10,749,848 B2 | 8/2020 | Voell |
| 10,764,752 B1 | 9/2020 | Avetisov |
| 10,783,164 B2 | 9/2020 | Snow |
| 10,817,873 B2 | 10/2020 | Paolini-Subramanya |
| 10,826,685 B1 | 11/2020 | Campagna |
| 10,855,446 B2 | 12/2020 | Ow |
| 10,873,457 B1 | 12/2020 | Beaudoin |
| 10,915,895 B1 | 2/2021 | Fogg |
| 10,929,842 B1 | 2/2021 | Arvanaghi |
| 10,949,926 B1 | 3/2021 | Call |
| 10,956,973 B1 | 3/2021 | Chang |
| 10,958,418 B2 | 3/2021 | Ajoy |
| 10,997,159 B2 | 5/2021 | Iwama |
| 11,042,871 B2 | 6/2021 | Snow |
| 11,044,095 B2 | 6/2021 | Lynde |
| 11,044,097 B2 | 6/2021 | Snow |
| 11,044,100 B2 | 6/2021 | Deery |
| 11,063,770 B1 | 7/2021 | Peng |
| 11,075,744 B2 | 7/2021 | Tormasov |
| 11,093,933 B1 | 8/2021 | Peng |
| 11,134,120 B2 | 9/2021 | Snow |
| 11,164,250 B2 | 11/2021 | Snow |
| 11,164,254 B1 | 11/2021 | Gordon, III |
| 11,170,366 B2 | 11/2021 | Snow |
| 11,171,782 B2 | 11/2021 | Tang |
| 11,205,172 B2 | 12/2021 | Snow |
| 11,276,056 B2 | 3/2022 | Snow |
| 11,295,296 B2 | 4/2022 | Snow |
| 11,296,889 B2 | 4/2022 | Snow |
| 11,328,290 B2 | 5/2022 | Snow |
| 11,334,874 B2 | 5/2022 | Snow |
| 11,347,769 B2 | 5/2022 | Snow |
| 11,348,097 B2 | 5/2022 | Snow |
| 11,348,098 B2 | 5/2022 | Snow |
| 11,423,398 B1 | 8/2022 | Mullins |
| 2001/0029482 A1 | 10/2001 | Tealdi |
| 2003/0018563 A1 | 1/2003 | Kilgour |
| 2004/0085445 A1 | 5/2004 | Park |
| 2005/0206741 A1 | 9/2005 | Raber |
| 2006/0075228 A1 | 4/2006 | Black |
| 2006/0184443 A1 | 8/2006 | Erez |
| 2007/0027787 A1 | 2/2007 | Tripp |
| 2007/0094272 A1 | 4/2007 | Yeh |
| 2007/0174630 A1 | 7/2007 | Shannon |
| 2007/0296817 A1 | 12/2007 | Ebrahimi |
| 2008/0010466 A1 | 1/2008 | Hopper |
| 2008/0028439 A1 | 1/2008 | Shevade |
| 2008/0059726 A1 | 3/2008 | Rozas |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass |
| 2010/0228798 A1 | 9/2010 | Kodama |
| 2010/0241537 A1 | 9/2010 | Kass |
| 2011/0061092 A1 | 3/2011 | Bailloeul |
| 2011/0161674 A1 | 6/2011 | Ming |
| 2012/0203670 A1 | 8/2012 | Piersol |
| 2012/0264520 A1 | 10/2012 | Marsland |
| 2013/0142323 A1 | 6/2013 | Chiarella |
| 2013/0222587 A1 | 8/2013 | Roskowski |
| 2013/0275765 A1 | 10/2013 | Lay |
| 2013/0276058 A1 | 10/2013 | Buldas |
| 2014/0022973 A1 | 1/2014 | Kopikare |
| 2014/0201541 A1 | 7/2014 | Paul |
| 2014/0229738 A1 | 8/2014 | Sato |
| 2014/0282852 A1 | 9/2014 | Vestevich |
| 2014/0289802 A1 | 9/2014 | Lee |
| 2014/0297447 A1 | 10/2014 | O'Brien |
| 2014/0344015 A1 | 11/2014 | Puértolas-Montañés |
| 2015/0052615 A1 | 2/2015 | Gault |
| 2015/0193633 A1 | 7/2015 | Chida |
| 2015/0206106 A1 | 7/2015 | Yago |
| 2015/0242835 A1 | 8/2015 | Vaughan |

(56) References Cited

U.S. PATENT DOCUMENTS

| | | |
|---|---|---|
| 2015/0244729 A1 | 8/2015 | Mao |
| 2015/0309831 A1 | 10/2015 | Powers |
| 2015/0332256 A1 | 11/2015 | Minor |
| 2015/0363769 A1 | 12/2015 | Ronca |
| 2015/0378627 A1 | 12/2015 | Kitazawa |
| 2015/0379484 A1 | 12/2015 | Mccarthy |
| 2016/0002923 A1 | 1/2016 | Alobily |
| 2016/0012240 A1 | 1/2016 | Smith |
| 2016/0021743 A1 | 1/2016 | Pai |
| 2016/0071096 A1 | 3/2016 | Rosca |
| 2016/0098578 A1 | 4/2016 | Hincker |
| 2016/0119134 A1 | 4/2016 | Hakoda |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-Mchugh |
| 2016/0253663 A1 | 9/2016 | Clark |
| 2016/0260091 A1 | 9/2016 | Tobias |
| 2016/0267472 A1 | 9/2016 | Lingham |
| 2016/0267558 A1 | 9/2016 | Bonnell |
| 2016/0275294 A1 | 9/2016 | Irvine |
| 2016/0283920 A1 | 9/2016 | Fisher |
| 2016/0292396 A1 | 10/2016 | Akerwall |
| 2016/0292672 A1 | 10/2016 | Fay |
| 2016/0292680 A1 | 10/2016 | Wilson, Jr. |
| 2016/0294783 A1 | 10/2016 | Piqueras Jover |
| 2016/0300200 A1 | 10/2016 | Brown |
| 2016/0300234 A1 | 10/2016 | Moss-Pultz |
| 2016/0321675 A1 | 11/2016 | Mccoy |
| 2016/0321751 A1 | 11/2016 | Creighton, IV |
| 2016/0321769 A1 | 11/2016 | Mccoy |
| 2016/0328791 A1 | 11/2016 | Parsells |
| 2016/0330031 A1 | 11/2016 | Drego |
| 2016/0330244 A1 | 11/2016 | Denton |
| 2016/0337119 A1 | 11/2016 | Hosaka |
| 2016/0342977 A1 | 11/2016 | Lam |
| 2016/0342989 A1 | 11/2016 | Davis |
| 2016/0344737 A1 | 11/2016 | Anton |
| 2016/0371771 A1 | 12/2016 | Serrano |
| 2017/0000613 A1 | 1/2017 | Lerf |
| 2017/0005797 A1 | 1/2017 | Lanc |
| 2017/0005804 A1 | 1/2017 | Zinder |
| 2017/0033933 A1 | 2/2017 | Haber |
| 2017/0053249 A1 | 2/2017 | Tunnell |
| 2017/0061396 A1 | 3/2017 | Melika |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels |
| 2017/0134162 A1 | 5/2017 | Code |
| 2017/0148016 A1 | 5/2017 | Davis |
| 2017/0161439 A1 | 6/2017 | Raduchel |
| 2017/0177898 A1 | 6/2017 | Dillenberger |
| 2017/0178237 A1 | 6/2017 | Wong |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian |
| 2017/0243289 A1 | 8/2017 | Rufo |
| 2017/0244757 A1 | 8/2017 | Castinado |
| 2017/0330279 A1 | 11/2017 | Ponzone |
| 2017/0344983 A1 | 11/2017 | Muftic |
| 2017/0346693 A1 | 11/2017 | Dix |
| 2017/0352031 A1 | 12/2017 | Collin |
| 2017/0353309 A1 | 12/2017 | Gray |
| 2017/0359374 A1 | 12/2017 | Smith |
| 2017/0364642 A1 | 12/2017 | Bogdanowicz |
| 2017/0373859 A1 | 12/2017 | Shors |
| 2018/0005186 A1 | 1/2018 | Hunn |
| 2018/0048599 A1 | 2/2018 | Arghandiwal |
| 2018/0075239 A1 | 3/2018 | Boutnaru |
| 2018/0075527 A1 | 3/2018 | Nagla |
| 2018/0082043 A1 | 3/2018 | Witchey |
| 2018/0088928 A1 | 3/2018 | Smith |
| 2018/0091524 A1 | 3/2018 | Setty |
| 2018/0097779 A1 | 4/2018 | Karame |
| 2018/0101701 A1 | 4/2018 | Barinov |
| 2018/0101842 A1 | 4/2018 | Ventura |
| 2018/0108024 A1 | 4/2018 | Greco |
| 2018/0117446 A1 | 5/2018 | Tran |
| 2018/0123779 A1 | 5/2018 | Zhang |
| 2018/0139042 A1 | 5/2018 | Binning |
| 2018/0144292 A1 | 5/2018 | Mattingly |
| 2018/0157700 A1 | 6/2018 | Roberts |
| 2018/0158034 A1 | 6/2018 | Hunt |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vinay |
| 2018/0189333 A1 | 7/2018 | Childress |
| 2018/0189781 A1 | 7/2018 | Mccann |
| 2018/0204213 A1 | 7/2018 | Zappier |
| 2018/0219683 A1 | 8/2018 | Deery |
| 2018/0219685 A1 | 8/2018 | Deery |
| 2018/0225640 A1 | 8/2018 | Chapman |
| 2018/0225649 A1 | 8/2018 | Babar |
| 2018/0241565 A1 | 8/2018 | Paolini-Subramanya |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276270 A1 | 9/2018 | Bisbee |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0356236 A1 | 12/2018 | Lawrenson |
| 2018/0365201 A1 | 12/2018 | Hunn |
| 2018/0365686 A1 | 12/2018 | Kondo |
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0028273 A1 | 1/2019 | Harras |
| 2019/0034459 A1 | 1/2019 | Qiu |
| 2019/0036887 A1 | 1/2019 | Miller |
| 2019/0036957 A1 | 1/2019 | Smith |
| 2019/0043048 A1 | 2/2019 | Wright |
| 2019/0044727 A1 | 2/2019 | Scott |
| 2019/0050855 A1 | 2/2019 | Martino |
| 2019/0057382 A1 | 2/2019 | Wright |
| 2019/0065709 A1 | 2/2019 | Salomon |
| 2019/0073666 A1 | 3/2019 | Ortiz |
| 2019/0080284 A1 | 3/2019 | Kim |
| 2019/0081793 A1 | 3/2019 | Martino |
| 2019/0081796 A1 | 3/2019 | Chow |
| 2019/0087446 A1 | 3/2019 | Sharma |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jayachandran |
| 2019/0205563 A1 | 7/2019 | Gonzales, Jr. |
| 2019/0236286 A1 | 8/2019 | Scriber |
| 2019/0251557 A1 | 8/2019 | Jin |
| 2019/0253240 A1 | 8/2019 | Treat |
| 2019/0253258 A1 | 8/2019 | Thekadath |
| 2019/0268141 A1 | 8/2019 | Pandurangan |
| 2019/0268163 A1 | 8/2019 | Nadeau |
| 2019/0281259 A1 | 9/2019 | Palazzolo |
| 2019/0287107 A1 | 9/2019 | Gaur |
| 2019/0287199 A1 | 9/2019 | Messerges |
| 2019/0287200 A1 | 9/2019 | Schuler |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1 | 10/2019 | Wright |

(56) References Cited

U.S. PATENT DOCUMENTS

| | | |
|---|---|---|
| 2019/0306150 A1 | 10/2019 | Letz |
| 2019/0311357 A1 | 10/2019 | Madisetti |
| 2019/0324867 A1 | 10/2019 | Tang |
| 2019/0332691 A1 | 10/2019 | Beadles |
| 2019/0333054 A1 | 10/2019 | Cona |
| 2019/0334715 A1 | 10/2019 | Gray |
| 2019/0334912 A1 | 10/2019 | Sloane |
| 2019/0340586 A1 | 11/2019 | Sheng |
| 2019/0340607 A1 | 11/2019 | Lynn |
| 2019/0342422 A1 | 11/2019 | Li |
| 2019/0347444 A1 | 11/2019 | Lowagie |
| 2019/0347628 A1 | 11/2019 | Al-Naji |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0361917 A1 | 11/2019 | Tran |
| 2019/0372770 A1 | 12/2019 | Xu |
| 2019/0378128 A1 | 12/2019 | Moore |
| 2019/0385165 A1 | 12/2019 | Castinado |
| 2019/0386940 A1 | 12/2019 | Hong |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004263 A1 | 1/2020 | Dalla Libera |
| 2020/0004946 A1 | 1/2020 | Gilpin |
| 2020/0005290 A1 | 1/2020 | Madisetti |
| 2020/0019937 A1 | 1/2020 | Edwards |
| 2020/0034571 A1 | 1/2020 | Fett |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0067907 A1 | 2/2020 | Avetisov |
| 2020/0075056 A1 | 3/2020 | Yang |
| 2020/0089690 A1 | 3/2020 | Qiu |
| 2020/0099524 A1 | 3/2020 | Schiatti |
| 2020/0099534 A1 | 3/2020 | Lowagie |
| 2020/0104712 A1 | 4/2020 | Katz |
| 2020/0118068 A1 | 4/2020 | Turetsky |
| 2020/0127812 A1 | 4/2020 | Schuler |
| 2020/0134760 A1 | 4/2020 | Messerges |
| 2020/0145219 A1 | 5/2020 | Sebastian |
| 2020/0151709 A1* | 5/2020 | Bryan ............... G06Q 20/3678 |
| 2020/0167870 A1 | 5/2020 | Isaacson |
| 2020/0175506 A1 | 6/2020 | Snow |
| 2020/0184555 A1* | 6/2020 | Gleizer ............... H04L 9/3247 |
| 2020/0195441 A1 | 6/2020 | Suen |
| 2020/0211011 A1 | 7/2020 | Anderson |
| 2020/0234386 A1 | 7/2020 | Blackman |
| 2020/0258061 A1 | 8/2020 | Beadles |
| 2020/0265515 A1* | 8/2020 | Runnels ............... H04L 9/50 |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0302433 A1 | 9/2020 | Green |
| 2020/0314648 A1 | 10/2020 | Cao |
| 2020/0320097 A1 | 10/2020 | Snow |
| 2020/0320514 A1 | 10/2020 | Snow |
| 2020/0320521 A1 | 10/2020 | Snow |
| 2020/0320522 A1 | 10/2020 | Snow |
| 2020/0320620 A1 | 10/2020 | Snow |
| 2020/0374129 A1 | 11/2020 | Dilles |
| 2020/0382480 A1 | 12/2020 | Isaacson |
| 2020/0389294 A1 | 12/2020 | Soundararajan |
| 2021/0035092 A1 | 2/2021 | Pierce |
| 2021/0042758 A1 | 2/2021 | Durvasula |
| 2021/0044976 A1 | 2/2021 | Avetisov |
| 2021/0073212 A1 | 3/2021 | Conley |
| 2021/0073750 A1 | 3/2021 | Ledford |
| 2021/0090076 A1 | 3/2021 | Wright |
| 2021/0097602 A1 | 4/2021 | Eichel |
| 2021/0119785 A1 | 4/2021 | Ben-Reuven |
| 2021/0144149 A1 | 5/2021 | Simons |
| 2021/0174353 A1 | 6/2021 | Snow |
| 2021/0200653 A1 | 7/2021 | Jetzfellner |
| 2021/0201321 A1 | 7/2021 | Studnitzer |
| 2021/0201328 A1 | 7/2021 | Gunther |
| 2021/0226769 A1 | 7/2021 | Snow |
| 2021/0226773 A1 | 7/2021 | Snow |
| 2021/0241282 A1 | 8/2021 | Gu |
| 2021/0248514 A1 | 8/2021 | Cella |
| 2021/0266167 A1 | 8/2021 | Lohe |
| 2021/0266174 A1 | 8/2021 | Snow |
| 2021/0272103 A1 | 9/2021 | Snow |
| 2021/0273810 A1 | 9/2021 | Lynde |
| 2021/0273816 A1 | 9/2021 | Deery |
| 2021/0326815 A1 | 10/2021 | Brody |
| 2021/0328804 A1 | 10/2021 | Snow |
| 2021/0342836 A1 | 11/2021 | Cella |
| 2021/0366586 A1 | 11/2021 | Ryan |
| 2022/0006641 A1 | 1/2022 | Snow |
| 2022/0012731 A1 | 1/2022 | Derosa-Grund |
| 2022/0019559 A1 | 1/2022 | Snow |
| 2022/0020001 A1 | 1/2022 | Snow |
| 2022/0023742 A1 | 1/2022 | Tran |
| 2022/0027893 A1 | 1/2022 | Snow |
| 2022/0027897 A1 | 1/2022 | Snow |
| 2022/0027994 A1 | 1/2022 | Snow |
| 2022/0027995 A1 | 1/2022 | Snow |
| 2022/0027996 A1 | 1/2022 | Snow |
| 2022/0029805 A1 | 1/2022 | Snow |
| 2022/0030054 A1 | 1/2022 | Snow |
| 2022/0034004 A1 | 2/2022 | Snow |
| 2022/0040557 A1 | 2/2022 | Tran |
| 2022/0043831 A1 | 2/2022 | Douglass |
| 2022/0058622 A1 | 2/2022 | Snow |
| 2022/0058623 A1 | 2/2022 | Snow |
| 2022/0083991 A1 | 3/2022 | Kemper |
| 2022/0103341 A1 | 3/2022 | Snow |
| 2022/0103343 A1 | 3/2022 | Snow |
| 2022/0103344 A1 | 3/2022 | Snow |
| 2022/0103364 A1 | 3/2022 | Snow |
| 2022/0141231 A1 | 5/2022 | Simons |
| 2022/0156737 A1 | 5/2022 | Wright |
| 2022/0172207 A1 | 6/2022 | Cella |
| 2022/0173893 A1 | 6/2022 | Basu |
| 2022/0198554 A1 | 6/2022 | Filter |
| 2022/0215389 A1 | 7/2022 | Balaraman |
| 2022/0245626 A1 | 8/2022 | Sewell |
| 2023/0185783 A1 | 6/2023 | Haddad |

FOREIGN PATENT DOCUMENTS

| | | |
|---|---|---|
| CN | 110599147 A | 12/2019 |
| CN | 112329041 A | 2/2021 |
| DE | 10128728 | 1/2003 |
| EP | 3726438 A1 | 10/2020 |
| EP | 3862947 A1 | 8/2021 |
| JP | S5383297 | 7/1978 |
| JP | 2021152931 A | 9/2021 |
| KR | 100653512 | 12/2006 |
| KR | 1747221 | 5/2017 |
| KR | 101747221 | 6/2017 |
| WO | 0049797 | 8/2000 |

(56) References Cited

FOREIGN PATENT DOCUMENTS

| WO | 2007069176 | | 6/2007 |
|---|---|---|---|
| WO | 2015077378 | | 5/2015 |
| WO | 2017190795 | A1 | 11/2017 |
| WO | 2018013898 | A1 | 1/2018 |
| WO | 2018109010 | | 6/2018 |
| WO | 2018127923 | A1 | 7/2018 |
| WO | 2018127923072018 | | 7/2018 |
| WO | 2019180702 | | 9/2019 |
| WO | 2019207504 | | 10/2019 |
| WO | 2020125839 | A1 | 6/2020 |

OTHER PUBLICATIONS

Merkle Mountain Ranges (MMRs)-Grin Documentation, https://quentinlesceller.github.io/grin-docs/technical/building-plocks/merkle-mountain-ranges/, 5 pages, printed Jun. 1, 2022.

Merkle Mountain Ranges, https://github.com/opentimestamps/opentimestamps-server/blob/master/doc/merkle-mountain-range.md, 3 pages, printed Jun. 1, 2022.

Michelson, Kyle, et al., "Accumulate: An identity-based blockchain protocol with cross-chain support, human-readable addresses, and key management capabilities", Accumulate Whitepaper, v1.0, Jun. 12, 2022, 28 pages.

MOF-BC: A Memory Optimized and Flexible BlockChain for Large Scale Networks. lle:///C:/Users/eoussir/Documents/e-Red%20Folder/16905961/NPL_MOF_BC_A%20Memory%20Optimized%20and%20Flexible%20Blockchain.pdf (Year:2018) 43 pages.

On blockchain and its integration with IoT. Challenges and opportunities. file:///C:/Users/eoussir/Downloads/1-s2.0S0167739X17329205-main%20(1).pdf (Year: 2018) 18 pages.

"Money in programmable applications: Cross-sector perspectives from the German economy", Deutsche Bundesbank Eurosystem, https://www.bundesbank.de, 18 pages, 2020.

Al-Naji, Nader et al., "Basis: A Price-Stable Cryptocurrency with an Algorithmic Central Bank" www.basis.io Jun. 20, 2017, 27 pages.

Alsolami, Fahad, and Terrance E. Boult. "CloudStash: using secret-sharing scheme to secure data, not keys, in multi-clouds." Information Technology: New Generations (ITNG), 2014 11th International Conference on. IEEE, 2014.

Ana Reyna et al.; On blockchain and its integration with IoT. Challenges and opportunities. Future generation computer systems. vol. 88, Nov. 2018, pp. 173-190. https://www.sciencedirect.com/science/article/pii/S0167739X17329205 (Year: 2018).

Casey, "BitBeat: Factom Touts Blockchain Tool for Keeping Record Keepers Honest", Wall Street Journal, Nov. 5, 2014.

Chakravorty, Antorweep, and Chunming Rong, "Ushare: user controlled social media based on blockchain." Proceedings of the 11th International Conference on Ubiquitous Information Management and Communication. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Crosby, Michael et al., "BlockChain Technology, Beyond Bitcoin", Sutardja Center for Entrepreneurship & Technology, Berkeley Engineering, Oct. 16, 2015, 35 pages.

Dai et al. TrialChain: A Blockchain-Based Platform to Validate Data Integrity in Large, Biomedical Research Studies arXiv: 1807.03662 Jul. 10, 2018 (Year: 2018).

Eberhardt et al., "ZoKrates—Scalable Privacy-Preserving Off-Chain Computations," https://ieeexplore.ieee.org/stamp/JSP?tp:::&armumber:::8726497. (Year:2018).

Feng and Luo, "Evaluating Memory-Hard Proof-of-Work Algorithms on Three Processors," PVLDB, 13(6): 898-911, 2020.

Fernandez-Carames et al.; A Review on the Use of Blockchain for the Internet of Things. https://ieeexplore.ieee.org/stamp/stamp.jsp?arnumber=8370027 (Year: 2018). 23 pages.

Haarmann, et al., "DMN Decision Execution on the Ethereum Blockchain," Hasso Plattner Institute, University of Potsdam, 15 pages.

Iddo Bentov, Bitcoin and Secure Computation with Money, May 2016 (Year: 2016).

Kim et al., "A Perspective on Blockchain Smart Contracts," Schulich School of Business, York University, Toronto, Canada, 6 pages.

Kroeger, T. et al., The Case for Distributed Data Archival Using Secret Splitting with Percival, 6th International Symposium on Resilient Control Systems (available at IEEE Xplore), p. 204-209 (Year: 2013).

Krol, Michal et al., "SPOC: Secure Payments for Outsourced Computations" https://arxiv.org/pdf/1807.06462.pdf. (Year: 2018).

Luther, "Do We Need A "Fedcoin" Cryptocurrency?," ValueWalk, Newstex Global Business Blogs, Dec. 30, 2015 (Year: 2015).

Luu et al., Making Smart Contracts Smarter, 2016.

Menezes, Alfred. J., et al. "Handbook of Applied Cryptography," 1997, CRC Press, p. 527-28.

Muhamed et al. EduCTX: A Blockchain-Based Higher Education Credit Platform, https://ieeexplore.ieee.org/stamp/stamp.jsp?arnumber=8247166. (Year: 2017). 16 pages.

Sokolowski, R. (2011). Signed, sealed, delivered: EMortgages are protected from unauthorized alteration by something called a tamper seal. Mortgage Banking, 71(6), 108(4). Retrieved from https://dialog.proquest.com/professional/docview/1068158815? accountid=131444 (Year: 2011).

United States: New Generation cryptocurrency, USDX Protocol, Offers Crypto Advantages and Fiat Pegging, Apr. 2, 2018 (Year: 2018).

Unknown, "Federated Learning: Collaborative Machine Learning without Centralized Training Data" Apr. 6, 2017, 11 pages.

Unknown, "Midex", https://promo.midex.com/Midex_EN.pdf, 25 pages.

Unknown, Xtrade White Paper, https://xtrade1-9649.kxcdn.com/wp-content/uploads/2017/09/xtrade-whitepaper.pdf Feb. 7, 2018, 37 pages.

Watanabe, Hiroki, et al. "Blockchain contract: Securing a blockchain applied to smart contracts." 2016 IEEE International Conference on Consumer Electronics (ICCE). IEEE, 2016.

White, Ron, "How Computers Work," Oct. 2003, QUE, Seventh Edition (Year: 2003), 23 pages.

Why offchain storage is needed for blockchain_V4_1 FINAL (Year: 2018), by IBM, 13 pages.

Written Opinion in PCT/US2021/040207, Inventor Snow, dated Oct. 7, 2021, 14 pages.

ZoKrates—Scalable Privacy-Preserving Off-Chain Computations, by Jacob Eberhardt, Stefan Tai , 8 pages, Nov. 3, 2011 (Year: 2011).

Office Action (Non-Final Rejection) dated Feb. 29, 2024 for U.S. Appl. No. 17/979,097 (pp. 1-15).

P. Sood, P. Palsania, S. Ahuja, S. Kumar, K. Khatter and A. Mishra, "Decentralised & Collaborative DocuPad Using Blockchain," 2022 IEEE Delhi Section Conference (DELCON), New Delhi, India, 2022, pp. 1-8, doi: 10.1109/DELCON54057.2022.9752853. ( Year: 2022).

* cited by examiner

| Illiquid Asset | Sections (Index) of Asset Related Documents & Information | Location of Hash Value on Blockchain 34 | Memory Location of Digital Representation in Database 28 |
|---|---|---|---|
| A | 302 Title | Block 1, location 1 | 412 Location 100 |
| | 304 Rent Roll | Block 1, location 2 | 414 Location 101 |
| | 306 Zoning Info | Block 2, location 10 | 416 Location 102 |
| | 308 Liabilities | Block 2, location 14 | 418 Location 103 |
| | 310 Valuation | Block 3, location 26 | 420 Location 104 / 430 |
| B | Lease | Block 1, location 10 | Location 110 |
| | Rent Roll | Block 2, location 11 | Location 111 |
| | Insurance(s) | Block 3, location 1 | Location 115 |
| | Liabilities | Block 3, location 2 | Location 120 |

FIG. 4

COMPUTER SYSTEM AND METHOD FOR PROGRAMMATIC COLLATERALIZATION SERVICES

REFERENCE TO PRIOR APPLICATIONS

This application claims the benefit of the following U.S. provisional applications, each of which is hereby incorporated by reference in its entirety:
1) U.S. Provisional Application Ser. No. 63/166,344, filed on Mar. 26, 2021;
2) U.S. Provisional Application Ser. No. 63/170,006, filed on Apr. 2, 2021; and
3) U.S. Provisional Application Ser. No. 63/224,431, filed on Jul. 22, 2021.

FIELD OF THE DISCLOSURE

The present invention relates to decentralized computer systems using self-executing programs for enabling digitized financial transactions.

BACKGROUND

Rapid digitization of the global economy has led to a proliferation of digital currencies, e.g., Bitcoin, Ethereum, Dogecoin, stablecoins, etc., also known as cryptocurrencies. Today, cryptocurrencies are used to buy various goods and services in online transactions. The underlying technology in these processes is called blockchain, which is a decentralized, digital database storing all forms of data, such as transactions, using lists of records, called blocks, that are linked together using cryptography. Each block contains a cryptographic hash of the previous block, time stamp, and data. The time stamp proves that the data in the block existed when the block was published on a decentralized computer system with its hash. As each block includes information about the preceding block, they form a chain, with each additional block reinforcing the ones before. Because the hash value of each block uniquely corresponds to the data in the block, once recorded, the data in any given block cannot be altered retroactively without also altering all the subsequent blocks. As a result, blockchains are resilient to data modifications.

Cryptocurrencies have also been used in financial lending transactions. In the traditional financial landscape, loans are secured by some asset, which acts as a collateral. When the asset is illiquid (e.g., larger commercial office building) and is worth many millions of dollars, the loan can typically be supported only by large financial institutions with a massive amount of capital. Moreover, the due diligence involved in approving such a loan often takes months or even years.

Lending using blockchain technology on decentralized computer systems, i.e., decentralized lending, has provided a new mechanism for processing and distribution of loans. Not only does it allow expediting the lending process, but it also removes the need to have a financial institution facilitate it. Present day decentralized lending, however, requires collateral to be liquid, which essentially restricts the collateral to cryptocurrencies.

In addition, because cryptocurrencies are highly volatile, loans using them as collateral can quickly become undercollateralized and subject to automatic liquidation.

As a result, billions in illiquid assets, such as artwork, residential, commercial, and industrial real estate, private equity, etc., cannot be used as collateral for decentralized lending, which means they are relegated to serving as collateral in traditional lending only. The lack of technology that would allow illiquid assets to be used in decentralized lending greatly limits the scope of this lending mechanism.

What is needed is a computer system and method that can use illiquid or substantially illiquid assets as collateral in automated digital lending transactions on decentralized systems.

What is also needed is a computer system and method for on-demand access to verified private data.

What is also needed is a computer system and method that enables both payment and value to be commuted during a transaction that involves illiquid or substantially illiquid assets.

What is also needed is a computer system and method that enables an investment mechanism that provides up to date information about the value of a collateralized illiquid asset.

What is also needed is a computer system and method that generates a digital special purpose vehicle that uses a self-executing program to lock in (use) an illiquid asset as a collateral for a loaned amount of cryptocurrency.

What is also needed is a computer system and method that generates a digital special purpose vehicle that uses a self-executing program to lock in a portion of an illiquid asset (e.g., one building out of a multi-building portfolio) as a collateral for a loaned amount of cryptocurrency.

What is also needed is a computer system and method that enables digital decentralized-lending transactions, using self-executing programs, in which the loaned amounts are provided by multiple tiers of funders.

What is also needed is a computer system and method that enables digital decentralized-lending transactions, using self-executing programs, in which the loaned amounts are supplied by multiple tiers of funders and where the funder(s) in at least one tier can affect the rules under which the digital decentralized lending transactions are executed.

SUMMARY

The present invention involves a novel decentralized computer network and method capable of using illiquid or substantially illiquid assets as collateral in automated decentralized digital lending transactions implemented using blockchain technology. The system facilitates automated transaction processing of complete, verified, and valued data, and real-time performance monitoring, enabling private markets to transact with greater velocity. The use of blockchain technology for decentralized loan transactions enables immutable data traceability. As a result, the invention creates a paradigm shift from traditional lending to a decentralized, digital lending platform for many types of illiquid or substantially illiquid assets. The resulting digital financial instrument may represent not only proportionate asset ownership but is also an auditable source of performance data, providing a platform having both know-your-customer and know-your-asset features.

The invented computer system and method involve receiving, by a first server, electronic documents and information comprising a digital representation of an illiquid asset, the digital representation indicating (showing) borrower's financial right in the asset. In one embodiment, the digital representation is recorded on a first blockchain and in an asset-information table, identifying the various sections of the digital representation and their respective locations on the blockchain. The digital representation and asset-information table are further updated (supplemented) based on additional data that confirms accuracy of the digital representation and/or value of the illiquid asset. (This way, the asset-information table is updated with at least one of digital representation of the illiquid asset and asset-valuation data of the illiquid asset.) A second server of the invented system generates an asset-value token and a data structure comprising a self-executing program for facilitating a decentralized loan transaction. The asset-value token is linked to the digital representation of the illiquid asset via the asset-information table in the first server. Using a predetermined set of rules, the second server determines an amount of digital currency needed for an automated digital loan transaction in which the illiquid asset serves as a collateral and, in return for an investment of digital currency by one or more funders, the second server issues one or more financial-return tokens. The data structure associates the issued financial-return tokens with the asset-value token and, through this association further associates the financial-return tokens with the digital representation of the illiquid asset via the asset-information table.

In another embodiment, the invented computer system and method involve receiving, by a first server, electronic documents and information comprising a digital representation of an illiquid asset, the digital representation indicating (showing) borrower's financial right in the asset. In one embodiment, the digital representation is hashed, and the resulting hash values are recorded on a blockchain and in an asset-information table, identifying the various sections of the digital representation and their respective hashes' locations on the blockchain. The digital representation is made accessible for valuation to relevant experts, such as data auditors, appraisers, pricing specialists, etc. The auditing, appraising, and/or pricing functions can be performed by automated digital expert systems, thus reducing or eliminating the need for human involvement. The digital representation and asset-information table are further updated (supplemented) based on additional data received from the experts that confirms accuracy of the digital representation and/or value of the illiquid asset. (This way, the asset-information table is updated with at least one of digital representation of the illiquid asset and asset-valuation data of the illiquid asset.) A second server, communicatively coupled to the first server, generates an asset-value token and a data structure comprising a self-executing program for facilitating a decentralized loan transaction. The asset-value token is linked to the digital representation of the illiquid asset via the asset-information table in the first server. Using a predetermined set of rules, the second server determines the amount of digital currency needed for an automated digital loan transaction in which the illiquid asset serves as a collateral and, in return for an investment of digital currency from one or more funders, issues one or more financial-return tokens. The data structure associates the issued financial-return tokens with the asset-value token and, through this association further associates the financial-return tokens with the digital representation of the illiquid asset via the asset-information table.

A system for performing a collateralized loan transaction includes a first server configured to: receive an electronic document including a digital representation of a illiquid asset, the digital representation identifying a financial interest in the illiquid asset by a borrower; hash the digital representation of the illiquid asset to generate a first hash value; record the first hash value on a first blockchain; store the digital representation of the illiquid asset at a first memory location; generate an asset-information table that associates a location of the first hash value on the first blockchain with the first memory location; receive asset-valuation data; store the asset-valuation data at a second memory location; hash the asset-valuation data to generate a second hash value; record the second hash value on the first blockchain; and update the asset-information table to associate a location of the second hash value with the second memory location. A second server is communicatively coupled to the first server and is configured to: generate an asset-value token comprising an association with the updated asset-information table; record the asset-value token on a second blockchain; determine an amount of digital currency for an automated digital transaction based on a programmed set of rules using the asset-value as a parameter; generate a data structure comprising a self-executing digital program for performing the automated digital transaction, the data structure including the asset-value token; and record the data structure on the second blockchain, wherein the automated digital transaction involves loaning the amount of digital currency at a rate of interest determined using the programmed set of rules, and wherein the illiquid asset, via the asset-value token, constitutes a collateral for the amount of digital currency being loaned.

The first server may periodically update the digital representation or valuation of the illiquid asset and the asset-information table before or after the amount of digital currency has been loaned. The second server is further configured to generate financial-return tokens, which can include governance tokens and return-interest tokens. The return-interest token could be a senior return-interest token or a subordinate return-interest token. The same may apply to governance tokens. The second server is further configured to provide access to the asset-information table in the first server to an entity possessing a financial-return token(s).

An automated method of the present invention for collateralizing an illiquid asset includes the steps of: receiving, by a first server, an electronic document including a digital representation of the illiquid asset and identifying a financial interest in the illiquid asset by a borrower; hashing, by the first server, the digital representation of the illiquid asset to generate a first hash value; recording, by the first server, the first hash value on a first blockchain; storing, by the first server, the digital representation of the illiquid asset at a first memory location; generating, by the first server, an asset-information table that associates a location of the first hash value on the first blockchain with the first memory location; receiving, by the first server, an asset-valuation data; storing, by the first server, the asset-valuation data at a second memory location; hashing, by the first server, the asset-valuation data, to generate a second hash value; recording, by the first server, the second hash value on the first blockchain; updating, by the first server, the asset-information table to associate a location of the second hash value with the second memory location; generating, by a second server, an asset-value token comprising an association with the updated asset-information table; recording, by the second server, the asset-value token on a second blockchain; determining, by the second server, an amount of digital currency for an automated digital transaction based on a programmed set of rules using the asset-value as a parameter; generating, by the second server, a data structure comprising a self-executing digital program for performing the automated digital transaction, the data structure including the asset-value token; and recording the data structure on the second blockchain; wherein the automated digital transaction involves loaning the amount of digital currency at a rate of interest determined using the programmed set of rules, and wherein the illiquid asset, via the asset-token, constitutes a collateral for the amount of digital currency being loaned.

In another embodiment, because hash values are unique, instead of the asset-information table storing a location of the hash values on the first blockchain, the asset-information table may store the hash values themselves.

As explained above, instead of recording on a blockchain a hashed value of the digital representation, the method includes recording on the blockchain the digital representation itself and storing in an asset-information table a location of the digital representation on the blockchain.

BRIEF DESCRIPTION OF THE FIGURES

The accompanying figures, where like reference numerals refer to identical or functionally similar elements throughout the separate views, together with the detailed description below, are incorporated in and form a part of the specification, and serve to further illustrate embodiments of concepts that include the claimed invention and explain various principles and advantages of those embodiments.

FIG. 4 shows an asset-information table in accordance with another embodiment of the present invention.

Figure 1:
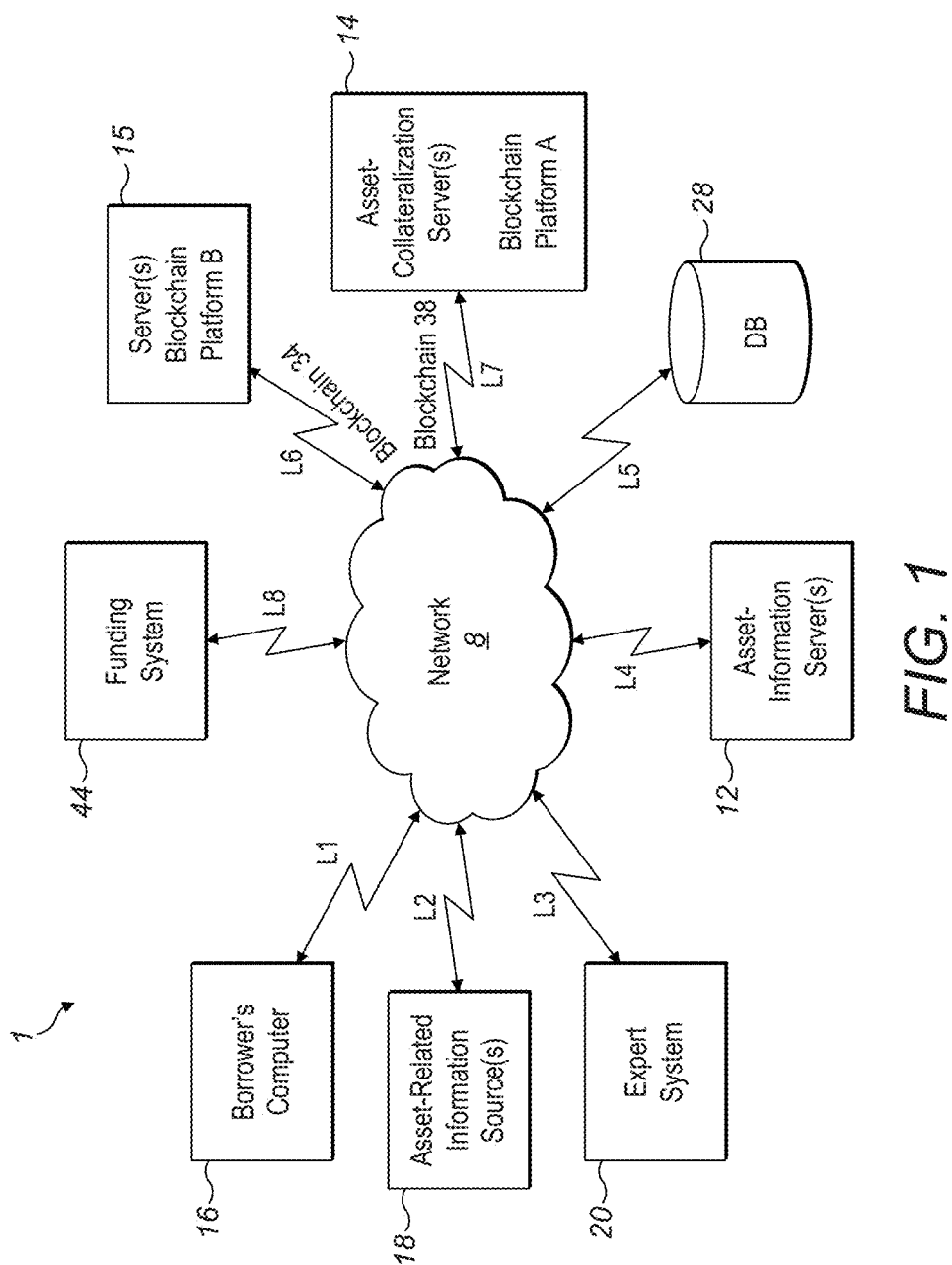
FIG. 1 shows a system in accordance with some embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description discloses some embodiments of the system and method of the present invention for programmatic collateralization of illiquid assets.

FIG. 1 shows a decentralized computer system for programmatic collateralization of illiquid assets in accordance with some embodiments of the present invention for decentralized loan processing and distribution. The system 1 includes an asset-information server(s) 12, a borrower's computer 16, an asset-related information source(s) 18, an expert system 20, a database 28, a funding system 44, a collateralization server(s) 14 that operates a blockchain on a blockchain-platform A. The system has other server(s) 15 that operate another blockchain on blockchain-platform B. In an alternative embodiment, server(s) 15 could operate a blockchain on the same platform as the collateralization server 14. The recited system components communicate with each other over a communication network 8, such as the Internet, via their respective communication links L1 though L8, which can be wired or wireless. Link L6 represents a communication channel used for recording and accessing information on an asset-information blockchain 34. Link L7 represents a communication channel used for recording and accessing information on a collateralization blockchain 38.

Figure 2:
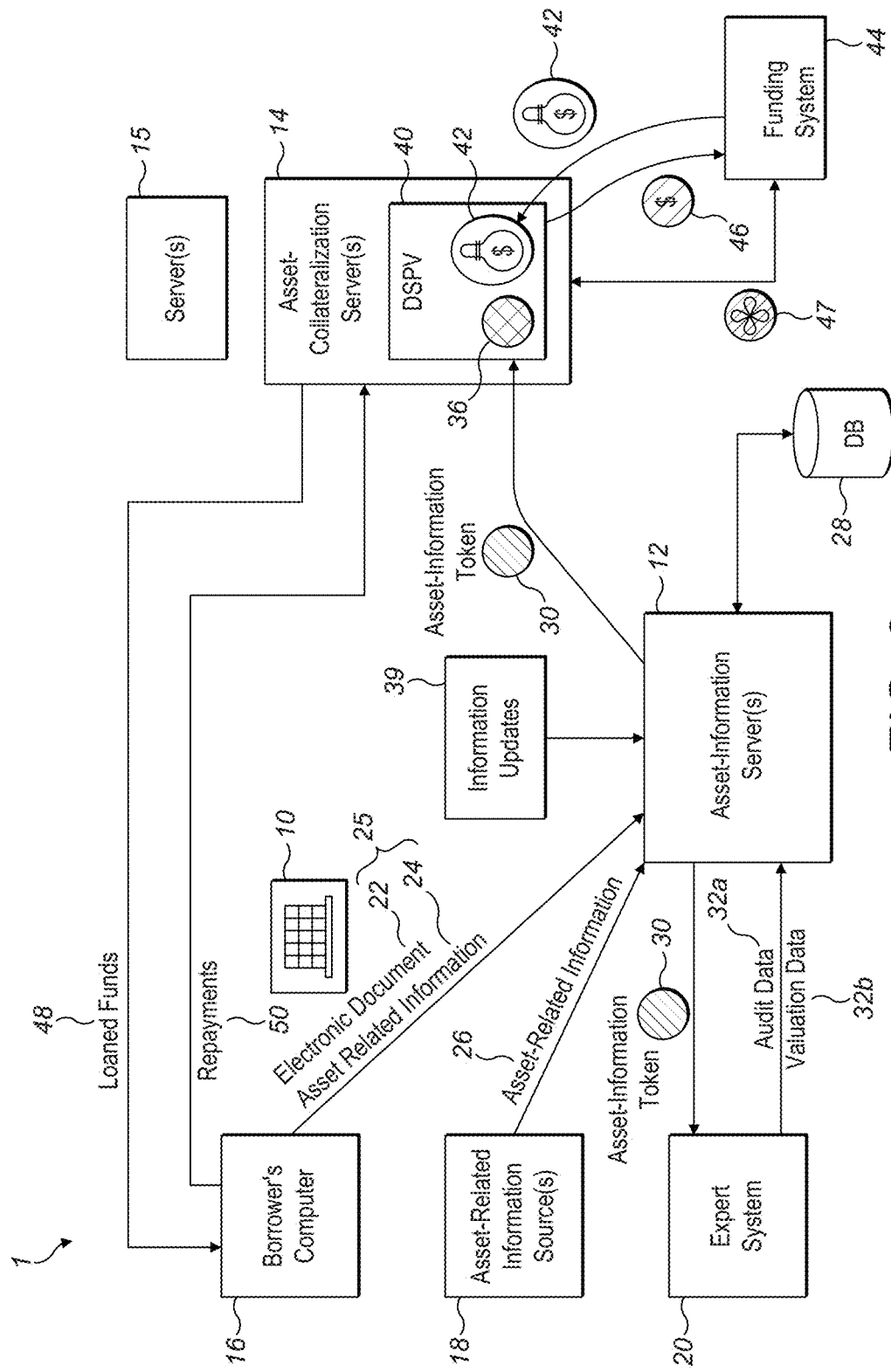
FIG. 2 is another view of a system in accordance with some embodiments of the present invention.

FIG. 2 shows a decentralized computer system 1 of FIG. 1 in more detail. (The communication network 8 in FIG. 1 is also present in the system illustrated in FIG. 2 but is not shown in FIG. 2.) FIG. 2 depicts an illiquid asset 10 in which a borrower has a financial right (interest), and which will be used as a collateral for a decentralized loan transaction. The process starts by having the borrower use his or her computer 16 to connect to the asset-information server 12 via the network 8. The borrower's computer 16 may already include a borrowing application (APP) stored on the device, or the asset-information server 12 may transmit a web page for the borrower to enter information regarding the asset and requested loan. Either way, having connected to the asset-information server 12, the borrower, via the borrower's computer 16, transmits to the asset-information server 12 a document(s) 22 describing the illiquid asset 10 and asset-related information 24. The document 22 may exist in any digital format, such as PDF, WORD, EXCEL, HTML, etc., constituting a digital representation 25 of the illiquid asset. The digital representation 25 includes information confirming the borrower's financial interest in the asset 10 (e.g., title, lease income, ownership, etc.), as well as any other asset-related information 24 that the borrower may need/wish to provide to the system for asset verification, asset valuation, and decentralized loan purposes. The digital representation may also include metadata about the electronic document(s) and asset-related information.

In addition to receiving the electronic document(s) 22, including asset-related information 24 from the borrower, the asset-information server 12 may also receive additional asset-related information 26 in any format from other source(s) 18.

The asset-information server 12 may process the received digital representation of the illiquid asset (digital data representing the illiquid asset) 25, such as by an artificial intelligence engine or other methods to extract certain data, create a summary, or metadata associated with the received information.

Figure 3:
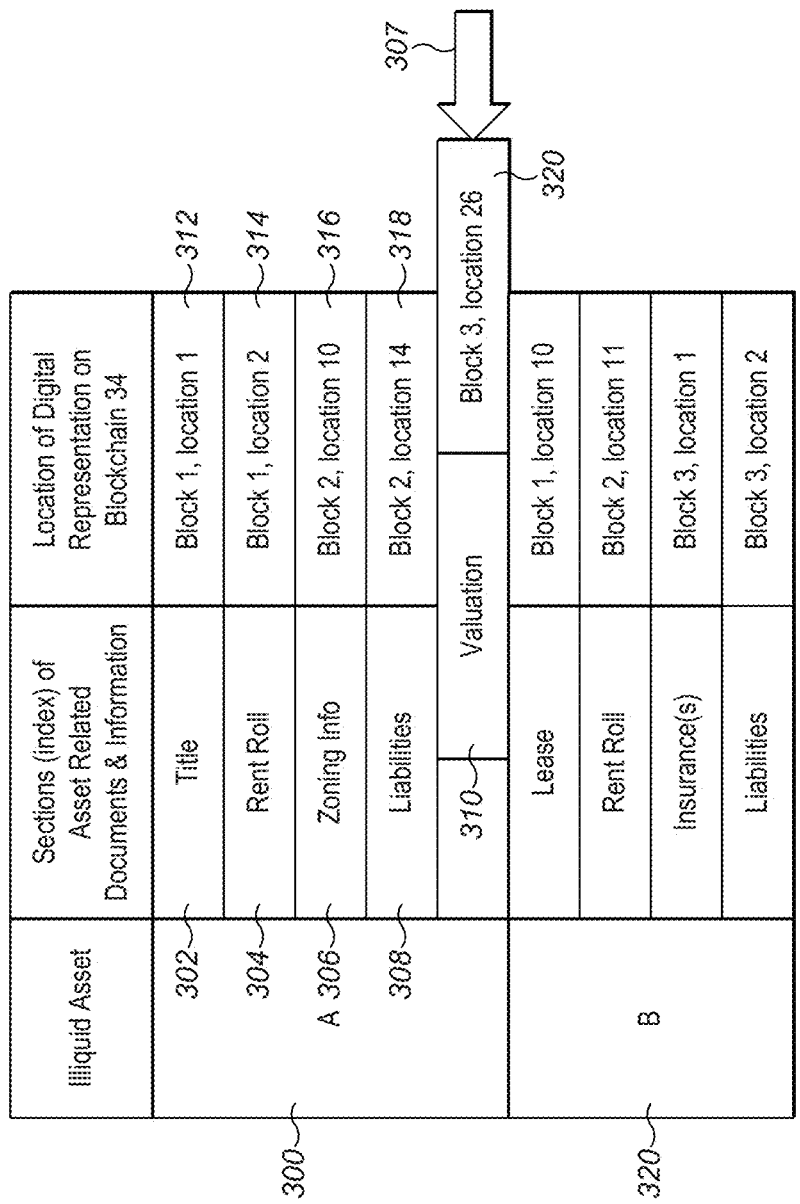
FIG. 3 shows an asset-information table in accordance with an embodiment of the present invention.

The asset-information server 12 may then record (publish) the digital representation of the illiquid asset on the asset-information blockchain 34 of server(s) 15. Blockchains and blockchain recordation are known in the art and will not be described here in detail. For example, blockchains and blockchain recordation are explained in U.S. Pat. No. 10,873,457, the disclosure of which is incorporated herein it its entirety. After recording the digital representation of the illiquid asset on the asset-information blockchain 34, the asset-information server 12 generates an asset-information table that associates each of the various sections of the digital representation with its respective location on the blockchain 34 at which the corresponding portion is stored. FIG. 3 illustrates one such table.

FIG. 3 shows an asset-information table that associates the various sections of the illiquid assets' digital representations to their respective locations on the asset-information blockchain 34. For example, the table in FIG. 3 shows that for an illiquid asset A (reference numeral 300) the server 12 has collected four documents and/or pieces of information that form the digital representation of asset A; the title 302, rent roll information 304, zoning information 306, and liabilities 308. The table further illustrates that digital representation of the title to asset A is located on the blockchain 34 at block 1, location 1 (reference numeral 312); digital representation of the rent roll information for asset A is located at block 1, location 2 (reference numeral 314); digital representation of zoning information is located at block 2, location 10 (reference numeral 316); and digital representation of borrower's liabilities is located at block 2, location 14 (reference numeral 318). As also shown in FIG. 3, the illiquid asset B (reference numeral 320) has its own mapping between the different sections of the digital representation of asset B and the respective locations on the asset-information blockchain 34 that contain the actual digital representations. Thus, the asset-information table can be thought of as an identification structure in which the left column designates directories of files, the middle column designates file names, and the right column designates locations on a blockchain at which the corresponding file contents are present. In addition to recording the digital representation of the illiquid asset on a blockchain, the server may also separately save the information in a database 28, central or distributed, or in its own memory.

In another embodiment, instead of recording the digital representation of an illiquid asset on the asset-information blockchain 34, the asset-information server 12 first hashes the digital representation of the illiquid asset using a hashing algorithm and then records the calculated hash values on the blockchain 34. Hashing algorithms are known in the art, and any hashing algorithm, e.g., SHA-256 algorithm, could be used to obtain a hash value of the digital representation of the illiquid asset. After recording the hash value(s) of the digital representation of an illiquid asset on the blockchain 34, the asset-information server 12 stores the digital representation either in its memory or in a database, central or distributed. (Note however, storage of the digital representation may precede recordation of its hash value on the blockchain.) Afterward, the asset-information server 12 generates an asset-information table that associates each of the various sections (portions) of the digital representation of the illiquid asset with a location on the blockchain 34 at which the corresponding hash value is stored, and also associates each section with a memory location in the database 28 storing the corresponding digital representation that was used to generate the hash value. FIG. 4 illustrates one such table.

FIG. 4 shows an asset-information table that associates the various sections of an illiquid asset's digital representation to locations on the asset-information blockchain 34 that contain the hash values of the corresponding sections, and also associates them with the respective memory locations in the database 28 where the corresponding digital representations that were used to generate those hash values are stored. For example, the table in FIG. 4 shows that for the illiquid asset A (reference numeral 300) digital representation includes four pieces of information; title 302, rent roll information 304, zoning information 306, and liabilities 308. The table also illustrates that hash value of the digital representation of title to asset A is located on the blockchain 34 at block 1, location 1 (reference numeral 412); hash value of the digital representation of the rent roll information for asset A is located at block 1, location 2 (reference numeral 414); hash value of the digital representation of zoning information is located at block 2, location 10 (reference numeral 416), and hash value of the digital representation of borrower's liabilities is located at block 2, location 14 (reference numeral 418). As further shown in FIG. 4, the table also associates each section of the digital representation of asset A with a corresponding location in the database where the respective portion of the digital representation itself is stored. For example, digital representation of title is shown as being stored in the database 28 at location 100 (reference numeral 422); digital representation of rent roll information is shown as being stored in the database 28 at location 101 (reference numeral 424); digital representation of zoning information is shown as being stored in the database 28 at location 102 (reference numeral 426); and digital representation of borrower's liabilities is shown as being stored in the database 28 at location 103 (reference numeral 428). As also shown in FIG. 4, the illiquid asset B (reference numeral 320) has its own mapping between the various sections of the digital representation of asset B, locations of their respective hash values on the asset-information blockchain 34, and memory location in the database 28 containing the actual digital representations. Instead of storing the digital representations of illiquid asset on the database 28, the server may save the information in its own memory. Memory locations in the rightmost column in FIG. 4 may also be Uniform Resource Locator (URL) addresses, or any other kind of addresses pointing to local or remote storage locations. In another embodiment, in addition to recording on the blockchain 34 hash values of the various pieces (portions) of the digital representation of an illiquid asset, the system may also record on the blockchain 34 the memory locations at which those corresponding pieces are stored.

Recording a hash value of a digital representation on the asset-information blockchain 34, as opposed to recording the digital representation itself, has several advantages. One advantage relates to the size of the resulting blockchain. Specifically, because hash values typically occupy less memory space than the corresponding digital representations of the illiquid assets, a blockchain that records the hash value of the digital representation of illiquid asset occupies less memory space than a blockchain that records the digital representation itself. And, because in decentralized computer networks a copy of the blockchain is stored on multiple network nodes, having a blockchain of smaller size saves memory space on each such node. Furthermore, reducing the size of the blockchain allows for faster transmission of the blockchain across the network.

Another advantage of recording a hash value is that it allows the system to confirm that the digital representation has not been changed from the time its hash value was generated, while precluding unwanted disclosure of the corresponding content of the digital representation. Specifically, because disclosure of a hash value does not lead to disclosure of the data that was used to generate it, there is no danger in publishing hash values of digital representations. Yet, when a party requests access to a specific portion of the digital representation of the illiquid asset, e.g., title (FIG. 4, Ref. 302) of the illiquid asset A (FIG. 4, Ref. 300), the asset-information server 12 can retrieve the digital representation of title from location 100 in the database 28 (FIG. 4, Ref. 422) and can also retrieve the corresponding hash value from location 1 in block 1 of blockchain 34 (FIG. 4, Ref. 412). At that point, the asset-information server 12 can hash the retrieved digital representation (digital data) of title and compare the resulting hash value to the hash value previously recorded on the asset-information blockchain 34. If the hash values match, it signifies that the retrieved digital representation of the title is authentic, i.e., it has not been changed from the time its hash value was recorded on the blockchain, at which point the retrieved digital representation of the title can be provided to the requesting party. Authenticity of the digital representation can thus be confirmed without having to disclose its content. If, however, the hash values do not match, it signifies that the original digital representation of the title was tempered with, in which case the retrieved digital representation may be flagged for further system analysis.

In another embodiment, the invention may use a modified version of the asset-information table of FIG. 4. Specifically, because various sections of the asset's digital representation have different binary ("Os" and "Is") content, each section will have a different, unique, hash value. As a result, instead of listing in the table the hash values' blockchain locations, the table may list the hash values themselves. In such a scenario, the system could then scan the blockchain 34 to confirm authenticity of a specific hash value in the table. Once the hash value has been authenticated, i.e., the hash value in the table is also present on the blockchain 34, the system may then retrieve the corresponding digital representation from a memory location identified in the table, hash the retrieved digital representation, and compare the resulting hash value to the hash value in the table. If the hash values match, then the retrieved digital representation is authentic. Otherwise, the retrieved digital representation has been tempered with, in which case the data would be flagged for further analysis.

Once the digital representation of the illiquid asset or its hash value has been recorded on the blockchain 34, access to the digital representation can be protected by the asset-information server via an access-rights mechanism, such as those using public-private encryption method. Access rights may be free, or may be provided for a fee, either in fiat currency or in cryptocurrency, or based on some other consideration.

For example, when a party requests access to a document or information concerning a particular illiquid asset, the server 12 may require the party to go through an authentication process, such as requiring the party to enter its login and password information, as is typically done with many software applications today. If the login and password match the login and password information in the system, the party is granted access to the data sought. Instead of a single factor authentication, a multi-factor authentication, known in the art, may be used.

In another embodiment, instead of using a login and password, access to information may be controlled using authentication approaches known in the art, such as the Web3 authentication. A party's (public) wallet address can be whitelisted and the party can prove its identity by signing a transaction using its private key, which would prove possession of the private key, thus confirming the party's identity.

The system may implement multi-tiered access rights. For example, parties with low-tier access, may only view (read) the digital representation, but may not download or supplement it. Parties (users) with a middle-tier access may read and download the digital representation but not supplement it. And parties with high-tier access may download, read, and supplement the digital representation. In addition, the ability to modify a digital representation may depend not only on the access-tier level but also on the type of data in question. For example, while rent-roll information may be supplemented by a party (user) with the high-tier of access rights, title information may not be supplemented regardless of the party's access-tier level.

In one embodiment, access rights may be implemented on a blockchain via cryptographic tokens. For example, when recording on the blockchain either digital representations of illiquid assets or their respective hash values, the server 12 may also record a cryptographic token that would control access rights to the digital representation. Such a token may also be associated with a self-executing program that would control access rights based on various specified conditions. FIG. 2 illustrates access rights to the digital representation of an illiquid asset being implemented via an asset-information token 30.

Once the asset-information server 12 receives digital representation of an illiquid asset and generates an asset-information table, the system proceeds to verify the information and to determine accurate market value of the corresponding illiquid asset. This may be accomplished by having an automated expert system(s) 20 (human experts may also be used) access the asset's digital representation, via an access-rights mechanism discussed above, and then analyze the data. For example, an audit expert system 20, or Deloitte or KPMG accountants, may audit the digital representation of the illiquid asset to confirm veracity of the information. The audit data 32a and the results of the audit are then received by the server 12.

In an embodiment where the server records asset's digital representation on the asset-information blockchain 34 and uses the asset-information table in FIG. 3, the received audit data and audit results for the particular asset are also recorded on the asset-information blockchain, acting as a certification of accuracy of the information contained in the digital representation. The asset-information table would then get updated to reflect the additional information. For example, once audit information regarding the digital representation of the illiquid asset A (FIG. 3, Ref. 300) has been recorded on the information blockchain 34, asset-information table of FIG. 3 in the server 12 is updated. Specifically, a row would be added in the middle and right columns of the table for asset A. In the middle column, the added cell could refer to documents and information labeled "audit information," and the added cell in the right column could include a location on the blockchain 34 where the digital representation of the audit information is stored.

In an embodiment where the server records hash values of the asset's digital representation on the asset-information blockchain 34 and uses the asset-information table shown in FIG. 4, the received digital representation of the audit data and audit results for the particular asset would be hashed and the hash values recorded on the blockchain 34, with the digital representation of the audit data 32a and results being saved in the database 28 (or server's memory). The asset-information table would then get updated to reflect the additional information. For example, once the hash of digital representation of audit information for the illiquid asset A (FIG. 4, Ref 300) has been recorded on the information blockchain 34, asset-information table in the server 12 is updated accordingly. Specifically, a row would be added in each of the three rightmost columns of the table for asset A. In the "Asset Related Documents & Information" column, the added cell could refer to documents and information labeled "audit information." In the "Location of Hash Value on Blockchain 34" column, the added cell would include a location of the hash value of the digital representation of audit information. In the rightmost column of the table in FIG. 4, the added cell would list the location in the database 28 where the digital representation of the audit information is stored.

The expert system 20 may also analyze the digital representation of the illiquid asset to determine its market value. For example, for a commercial real estate asset, a real estate appraisal expert system, or human appraiser from such a firm as Cushman & Wakefield, may be used to perform an appraisal. The appraisal data is then also recorded on the asset-information blockchain 34, acting as a certification of the asset's appraised value.

In an embodiment where the server records on the asset-information blockchain 34 asset's digital representation and uses the asset-information table in FIG. 3, the received digital representation of the appraisal data and appraisal results for the particular asset are also recorded on the asset-information blockchain 34, acting as a certification of the asset's value. The asset-information table would then get updated to reflect the additional information. For example, once an appraisal information regarding the digital representation of the illiquid asset A (FIG. 3, Ref. 300) has been recorded on the asset-information blockchain 34, asset-information table of FIG. 3 in the server 12 is updated. Specifically, a row would be added in the middle and right columns of the table for asset A. In the middle column, the added cell could refer to documents and information labeled "appraisal information," and the added cell in the right column could include a location on the blockchain 34 where the digital representation of this appraisal information is stored.

In an embodiment where the server records hash values of the asset's digital representation on the asset-information blockchain 34 and uses the asset-information table shown in FIG. 4, the received appraisal data and appraisal results for the particular asset would be hashed first, the hash values recorded on the asset-information blockchain 34, with the appraisal information being saved as digital representation in the database 28 (or server's memory). The asset-information table would then get updated to reflect the appraisal information. For example, once a hash value of the digital representation of appraisal information for the illiquid asset A (FIG. 4, Ref. 300) has been recorded on the asset-information blockchain 34, asset-information table in the server 12 is updated. Specifically, a row would be added in each of the three rightmost columns of the table for asset A. In the "Asset Related Documents & Information" column, the added cell could refer to documents and information labeled "appraisal information." In the "Location of Hash Value on Blockchain 34" column, the added cell would include a location of the hash value of the digital representation of appraisal information. In the rightmost column of the table in FIG. 4, the added cell would list the location in the database 28 where the digital representation of the appraisal information is stored.

In addition, or as an alternative to an appraisal expert, the invention may use a pricing expert system. The pricing expert system or a human pricing agent may be used to further estimate the asset's market value. This valuation data is then recorded on the asset-information blockchain 34, acting as a certification of the asset's value.

In an embodiment where the server records on the asset-information blockchain 34 asset's digital representation and uses the asset-information table of FIG. 3, the digital representation of the pricing data and pricing results for the particular asset are also recorded on the asset-information blockchain, acting as a certification of asset's market value. (Appraisal and pricing data can each be referred to as "valuation" data 32b.) The asset-information table would then get updated to reflect the additional information. For example, once digital representation of pricing information concerning the illiquid asset A (FIG. 3, Ref 300) has been recorded on the asset-information blockchain 34, asset-information table of FIG. 3 in the server 12 is updated. Specifically, as shown by arrow 307 in FIG. 3, a row would be added in the middle and right columns of the table for asset A. In the middle column, the added cell 310 could refer to documents and information labeled "Valuation" and the added cell 320 in the right column would list a location, e.g., Block 3, location 26, on the blockchain 34 where the digital representation of the valuation data is stored.

In an embodiment where the server records on the asset-information blockchain 34 hash values of the asset's digital representation and uses the asset-information table shown in FIG. 4, the received pricing data and pricing results for the particular asset would be hashed first, the hash values recorded on the asset-information blockchain 34, with the digital representation of the pricing data and results being saved in the database 28 (or server's memory). The asset-information table would then get updated to reflect pricing information. For example, once a hash value of the digital representation of pricing information for the illiquid asset A (FIG. 4, Ref. 300) has been recorded on the asset-information blockchain 34, asset-information table in the server 12 is updated. Specifically, as shown by arrow 407 in FIG. 4, a row would be added in each of the three rightmost columns of the table for asset A. In the "Asset Related Documents & Information" column, the added cell 310 could refer to documents and information labeled "Valuation." In the "Location of Hash Value on Blockchain 34" column, the added cell 420 would list a location, e.g., Block 3, location 26, of the hash value of the digital representation of valuation information on the blockchain 34. In the rightmost column of the table of FIG. 4, the added cell 430 would list the location, e.g., Location 104, in the database 28 where the digital representation of valuation information is stored.

The modified version of asset-information table in FIG. 4, where instead of recording locations of hash values, the hash values themselves are recorded, would be updated similarly. Except, instead of supplementing the table with the blockchain locations storing hash values of digital representations of audit, appraisal, and/or pricing, the system would supplement the table with the actual hash values of those digital representations. Although each of FIGS. 3 and 4 shows a single asset-information table generated for multiple assets, the invention also includes an embodiment in which a separate asset-information table is generated for each asset.

Once asset-information table has been updated with the audit and appraisal, and/or pricing data, the asset-information server 12 provides the collateralization server 14 with access rights to the asset-information table and its associated information.

Access rights could be credentialed via a username and password login method. Alternatively, access rights could be credentialed by providing the collateralization server 14 with an asset-information token 30 for the asset-information blockchain 34. Asset-information token may not only include access-rights information, but may also link to an asset-information table in the asset-information server 12. In another embodiment, instead of using a login and password, access to information may be controlled using authentication approaches known in the art, such as the Web3 authentication. A party's (public) wallet address can be whitelisted and the party can prove its identity by signing a transaction using its private key, which would prove possession of the private key, thus confirming the party's identity.

Once the collateralization server 14 receives access to an asset-information table, via the asset-information token 30 or otherwise, it generates an asset-value token 36 and records it on an asset-collateralization blockchain 38, which is running on a collateralization server 14 and its associated decentralized server system.

The asset-value token 36 incorporates a mechanism for accessing the asset-information table in the asset-information server 12 and the table-associated data.

For example, the asset-value token 36 may include a link to the asset-information token 30, i.e., the blockchain address (digital identifier) of the asset-information token 30 on the asset-information blockchain 34, or it may incorporate information from the received asset-information token 30.

The asset-value token 36 may be a digital rights management (DRM) token that provides access rights and points to the asset-information table, or part thereof, in the asset-information server 12.

In another embodiment, the asset-token 36 may include the audit and valuation data in addition to including DRM-type access to the corresponding asset-information table.

In yet another embodiment, the asset-token 36 may include the audit and valuation data and the blockchain address (digital identifier) of the corresponding asset-information token 30 on the asset-information blockchain 34.

The asset-value token 36 may be associated with a self-executing digital program for automated execution based on various specified conditions, such as periodically checking for any updates in the asset-information table or requesting that the asset-information table be updated with current data. Thus, while an asset-information table in the asset-information server 12 may be updated from time to time by the asset-information server 12 or a self-executing program associated with the asset-information token 30, table updates may also be initiated by the collateralization server 14 or the asset-value token 36.

In FIG. 2, the asset-information blockchain 34 and the asset-collateralization blockchain 38 are shown as two separate blockchains, running on different blockchain platforms. For example, while the asset-collateralization blockchain 38 may run on Ethereum platform, the asset-information blockchain 34 may run on another blockchain platform. In other embodiments, however, the two blockchains may not only run on the same blockchain platform, e.g., Ethereum, but they may also be the same blockchain. In another embodiment, functions of the asset-information server 12 and of asset-collateralization server 14 may be performed by a single server. Moreover, in another embodiment, the asset-information token 30 and the asset-value token 36 may be the same token, i.e., one and the same.

Having generated the asset-value token 36, the collateralization server 14 uses a digitally programmed set of rules incorporating the determined asset value as a parameter to calculate an amount of digital currency for which the illiquid asset could serve as a collateral in a decentralized loan transaction. The rules may also take into account other parameters, such as the loan duration, interest rate, risk level, etc. The rules may also set escrow parameters for the decentralized loan transaction.

Once the possible loan amount has been determined, using digitally programmed set of rules, the collateralization server 14 generates a software object, referred to herein as a decentralized special purpose vehicle ("DSPV") 40, that ties or associates the determined loan amount to the asset-value token 36, which in turn is associated either directly or indirectly with the digital representation of the illiquid asset, including its audit and valuation data. The software object may be a smart contract (self-executing program) programmed on a blockchain platform, e.g., Ethereum platform.

The asset-collateralization server 14 collects liquid funds for the loan and programmatically ties or associates them in the DSPV 40 to the illiquid asset, via the asset's asset-value token 36, which results in the illiquid asset being programmatically secured as collateral for the upcoming loan.

As shown in FIGS. 1 and 2, the invention includes a funding system 44. The funding system 44 represents devices through which funders (depositors, creditors, sponsors) provide liquid funds 42, whether in cryptocurrencies or in fiat currencies, for the collateralization server to use in the decentralized loan transaction. If the funders provide funds in fiat currencies, the funds are first converted to a cryptocurrency, e.g., stablecoins (which are tied to assets like fiat currencies). The asset-collateralization server 14 uses a digitally programmed set of rules to generate various types of financial-return tokens that will provide financial returns to the various funders. Thus, as shown in FIG. 2, the funding system 44 provides liquid funds 42 to the DSPV 40, and the collateralization server 14, through DSPV, issues financial-return tokens, such as return-interest token(s) 46 and/or governance token(s) 47 (explained below), to funders 44. Each return-interest token 46 may be associated either with 100% of the loan amount or with a fraction of the loan amount. As a result, various return-interest tokens may entitle their holders to unequal rates of interest income in return. All of this may be determined by the set of programmed rules in the collateralization server 14 and effectuated via a self-executing program in the DSPV 40. As explained below, return-interest tokens may have various seniority levels (tranches) with each tranche presumably having different interest rates. Thus, the DSVP 40 not only includes the asset-value token 36, which links and collateralizes the digital representation of the illiquid asset, but also associates the asset-value token 36 to financial-return tokens.

In one embodiment, liquid funds may be available in the asset-collateralization server 14, as part of a credit pool, even prior to generating the asset-value token 36. In another embodiment, the funds start being collected from depositors once the asset-value token gets generated in the asset-collateralization server 14 and the DSPV data structure is created. This way, potential depositors can evaluate the digital representation of the illiquid asset being collateralized and decide whether to invest their funds in a particular loan transaction. The DSPV can be used to crowdfund a particular loan project by raising funds from a large number of people over the Internet. The information in the DSPV, including the asset-value token 36 and the issued financial-returns tokens, is being recorded on the asset-collateralization blockchain 38 on an ongoing basis, as the depositors and other funders contribute funds for the decentralized loan transaction.

Once a sufficient amount of liquid funds for the loan has been collected and the DSPV is recorded on the blockchain 38, the loan is ready for distribution to the borrower's computer or his digital wallet. In another embodiment, the loaned amount of digital currency is converted to fiat currency, which is then provided to the borrower. FIG. 2 diagrammatically illustrates loaned digital funds 48 being distributed to the borrower, via borrower's computer 16 (his digital wallet), and repayments 50 being transmitted back to the DSPV 40 in the collateralization server 14, for further distribution to the funders as return interest payments through their respective interest tokens and governance tokens. All of this takes place on the asset-collateralization blockchain 38. The distribution of the loaned funds to the borrower and any repayments by the borrower are also automatically recorded on the blockchain 38 as they occur.

The present invention also contemplates updating and supplementing of the digital representation, auditing, and valuation of the illiquid asset. Such updates could be periodic or non-periodic. For example, supplemental asset-related information can be received and added to the information about the illiquid asset that is already present on the asset-information blockchain 34. Such supplemental information could come from the borrower himself/herself or it can come from other sources. In addition, the asset-information server 12 may be programmed to scan the web, including social media platforms and Internet-of-Things sensor data using web bots (also referred to as web crawlers) for any asset-related information, and record the newly found data to the asset-information blockchain 34. The data may also be crowdsourced. This way, the digital representation of an illiquid asset stays current over time, and the asset may be periodically re-valued by the expert system 20, to make sure that the loan does not become under-collateralized. The supplementation and re-valuation not only result in additional recording on the asset-information blockchain 34, but also result in the corresponding asset-information table in the server 12 being updated. Having the ability to update information about an illiquid asset in a way that guarantees data's immutability helps to monitor the collateralized value of the illiquid asset during the life of the loan and to propagate changes to the asset-value token and potential actions by the DSPV. For example, if the asset value increases, the DSPV may allow for additional funds to be borrowed. On the other hand, if the asset value decreases, funds from a sponsor may be used to cover (provide a backstop for) the loan.

Updates to the digital representation of the illiquid asset can also be initiated either by the self-executing digital program in the DSPV 40 or by the self-executing program in the asset-value token 36 itself, which forms a part of the DSPV 40. In FIG. 2, this feature is shown via an update input 39 received by the asset-information server 12. Regardless of how the updates are initiated, the updated digital representation of the illiquid asset is available to the DSPV 40, and thus funders, for further processing and analysis.

Figure 5:
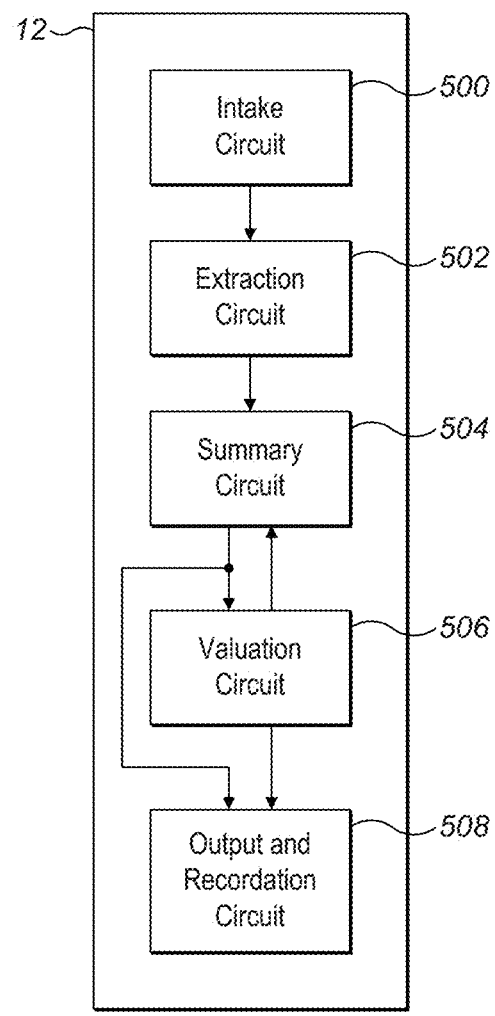
FIG. 5 shows a conceptual diagram of the asset-information server in accordance with some embodiments of the present invention.

FIG. 5 shows a conceptual diagram of the asset-information server 12 in accordance with some embodiments of the present invention. The asset-information server 12 includes a number of structural elements that perform various functions. An intake circuit 500 is communicatively coupled to the network 8 (see FIG. 1). The intake circuit is responsible for receiving digital electronic documents, asset-related information, output(s) of the expert system 20, outputs from collateralization server 14, etc. The digital representation may be received in various formats, such as PDF, WORD, EXCEL, HTML, bitmap, graphical, audio, etc. The invention also contemplates a natural language processing engine (NLP), which enables processing of incoming data that is unstructured. During the receiving step, the intake circuit 500 identifies the format of an incoming digital representation, so that the format information could be passed to an extraction circuit 502. Once the digital representation passes to the extraction circuit 502, the extraction circuit 502 processes it to extract relevant data, such as metadata. This may involve using an artificial intelligence engine, which may be integrated into the extraction circuit 502. After the data has been extracted, it is provided to a summary circuit 504, which integrates the extracted data into a digital representation of the illiquid asset. The digital representation can be supplemented by data from a valuation circuitry 506, which integrates the audit, appraisal, and pricing data and results from the expert system 20 into the asset's digital representation.

An output-and-recordation circuit 508 is responsible for storing the digital representation of the illiquid asset in a database 28 (or in the internal memory of the asset-information server 12), recording data on blockchains, generating asset-information token 30, as well as periodically generating signals for searching the network 8 for additional asset-related information, e.g., by generating web crawlers, etc. Although structural elements 500, 502, 504, 506, and 508 have been described as circuits, they may be implemented in hardware, software, firmware, or their combinations.

As mentioned above, the DSPV may have different funders. Some funders may be depositors whose contributions are limited to providing liquid assets for a particular DSPV loan based on a set of rules. Other funders may act as creditors, e.g., retail and institutional investors that combine their respective contributions into a pool of liquid assets that is then available for the collateralization server 14 to allocate to one or more DSPVs under a predetermined set of rules. These rules may be the same or different from the rules applied concerning depositors' investments. A creditor-funder may be entitled to a larger interest than a depositor-funder.

The invention also contemplates having a standby credit facility, where liquid funds might be obtained through banks, insurance companies, flexible deposits, and matched deposits.

Yet other funders may be referred to as sponsors. These funders may not only provide liquid funds at the start of the decentralized loan transaction but may also provide funds to cover the loan in case it might become undercollateralized in the future. Because a sponsor-funder acts as a backstop for the loan, taking on greater risk, the sponsor-funder may be entitled to a higher interest rate than a depositor-funder or a creditor-funder.

As a result, a DSPV 40 may have several tiers of return-interest tokens 46, with each tier being associated with its own percentage of return interest. For example, a first tier may be assigned to depositors, a second tier may be assigned to creditors, and a third tier may be assigned to sponsors.

Moreover, even within the same tier, there may be distinct token levels (tranches). For example, return-interest tokens 46 for depositor-funders may include senior return-interest tokens (senior level return-interest tokens) and subordinate return-interest tokens (junior level return-interest tokens), representing different positions in the DSPV 40. For example, a depositor-funder with a senior level return-interest token would be entitled to collect interest before a depositor-funder with a junior level return-interest token.

In addition to having separate tiers of interest tokens, the rules under which the asset-collateralization server 14 operates and generates DSPV 40 may be controlled by governance tokens (FIG. 2, Ref. 47). For example, creditor-funders and/or sponsor-funders may not only have rights to collect interest income but may also have a voice in setting the rules for a decentralized loan and the types of collateral that would qualify for the loan. As a result, instead of being issued return-interest tokens 46, some funders, such as creditor-funders and/or sponsor-funders, may be issued governance tokens 47. Importantly, governance tokens 47 may represent only governance or they may represent both governance and financial-return interest.

Figure 6A:
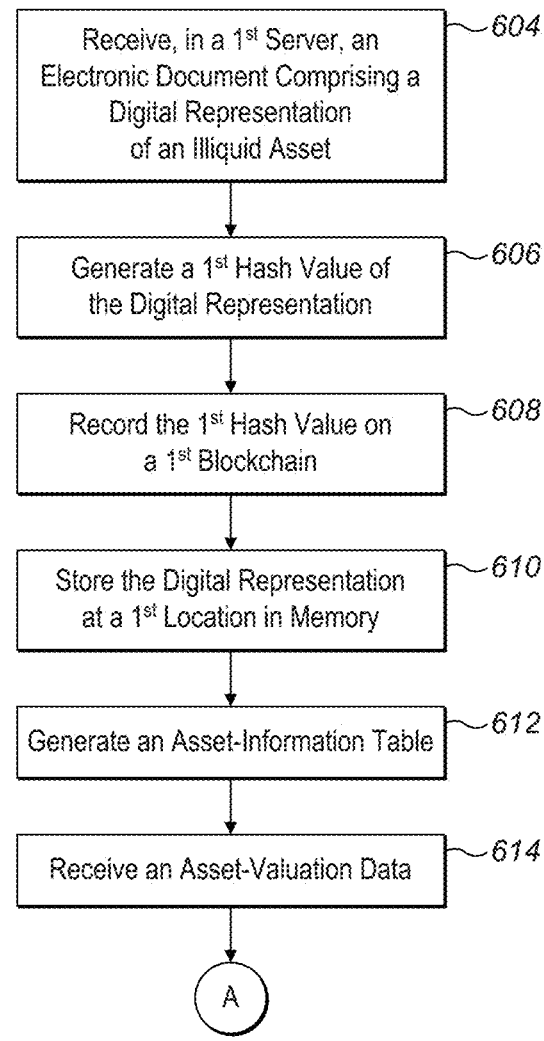
FIGS. 6(a), 6(b), and 6(c) show a flow chart of a method in accordance with some embodiments of the invention.
Figure 6B:
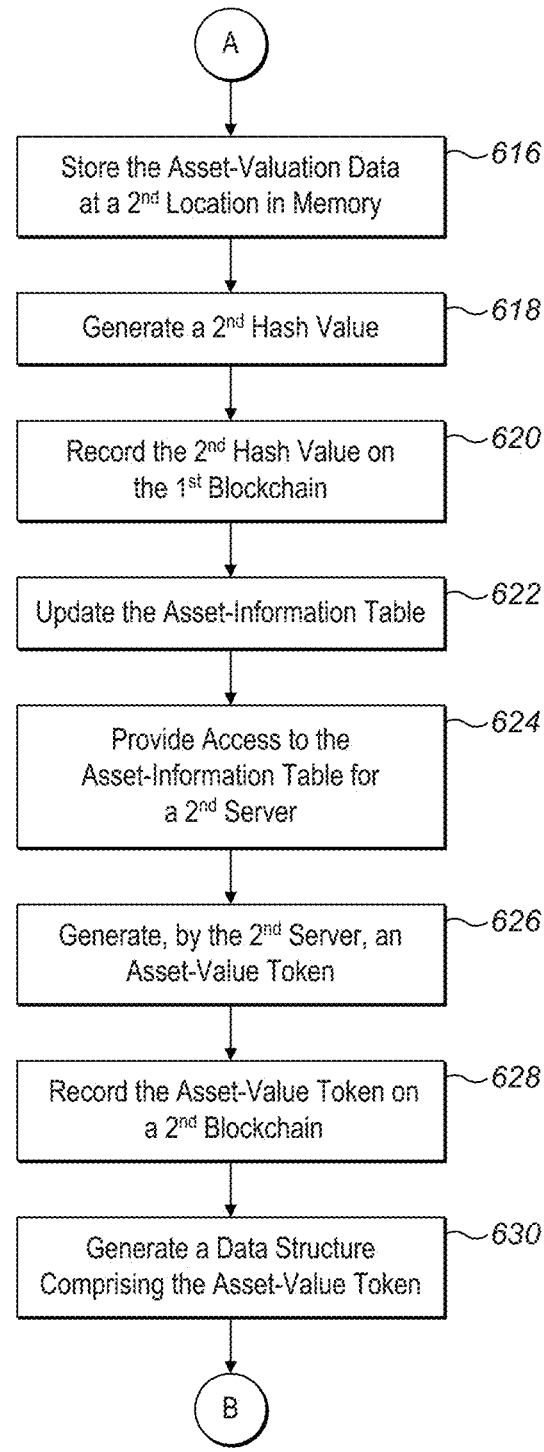
Figure 6C:
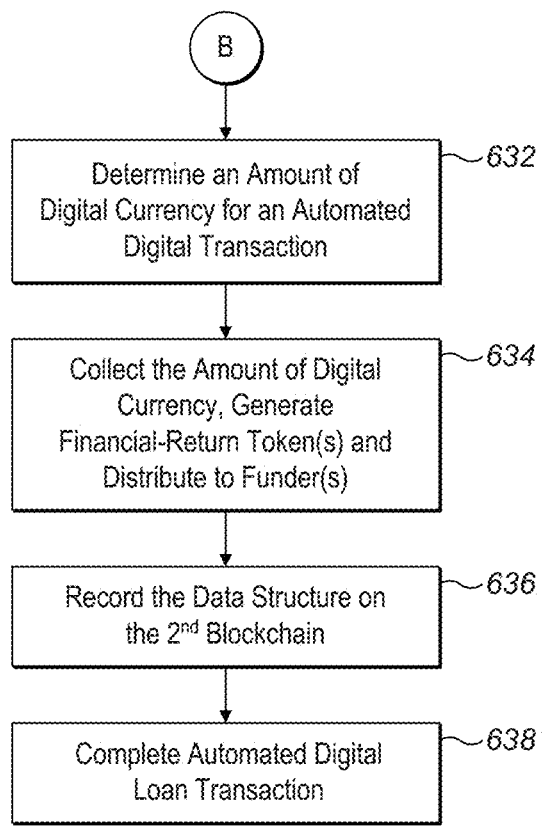

FIGS. 6(*a*), 6(*b*) and 6(*c*) show a flow chart of a method in accordance with some embodiments of the invention. The process starts at Step 604 in FIG. 6(*a*), with the asset-information server 12, referred to in the figure as a first server, receiving an electronic document and/or asset-related information comprising a digital representation of an illiquid asset that confirms borrowing party's financial interest in the asset. Next, at Step 606, the asset-information server 12 uses a hashing algorithm to generate a hash value of the digital representation. (If the received document and/or asset related information has multiple sections, the invention contemplates hashing the digital representations of each section, thus generating several corresponding hash values.) At Step 608, the hash value(s) is stored on an asset-information blockchain 34, referred to in the FIG. 6(*a*) as a first blockchain. At Step 610, the asset-information server 12 stores the digital representation of the illiquid asset at a first location (or a set of locations) in memory storage. As discussed above, the memory can be a central or distributed database or it can be memory storage in the server 12 itself. Next, at Step 612, the system generates an asset-information table, such as the ones discussed above with reference to FIGS. 3 and 4. At Step 614, the asset-information server 12 receives asset-valuation (audit, appraisal and/or pricing) data, in the form of a digital representation, from the expert system 20.

Proceeding to FIG. 6(*b*), at Step 616, the received asset-valuation data is also stored in memory, at a second location. At Step 618, the hashing algorithm is used to hash the digital representation of the asset-valuation data, and at Step 620, the hash value(s) is stored on the asset-information blockchain 34. Then, at Step 622, the asset-information table in the asset-information server 12 is updated with the digital representation of the asset-valuation data for the asset in question. Next, at Step 624, the asset-information server 12 provides the asset-collateralization server 14 (referred to in the figure as a second server) with access to the asset-information table, which in turn provides access to the underlying digital representation for the asset in question. Having received access to the asset-information table, at Step 626 the asset-collateralization server 14 generates an asset-value token 36. At Step 628, the asset-collateralization server 14 records the asset-value token 36 on an asset-collateralization (loan) blockchain 38, referred to in the figure as a second blockchain. At step 630, the asset-collateralization server 14 generates a data structure 40, referred to in the preceding paragraphs as a DSPV, which includes a self-executing digital program and the asset-value token 36.

Proceeding to FIG. 6(*c*), at Step 632, based on a set of programmed rules, the asset-collateralization server 14, directly or via the DSPV 40, determines an amount of digital currency for an automated digital loan transaction. Then, at Step 634, the amount of digital currency needed for the loan transaction is collected from funders, and the financial-return tokens are generated. Next, at Step 636, the DSPV 40 data structure, including the asset-value token and the financial-return tokens, is recorded on the asset-collateralization blockchain 38. Finally, at Step 638, the system completes the automated digital loan transaction. This includes providing the loaned amount of digital currency to the borrower's computer, activating the rights represented by the financial-return tokens and in return automatically receiving (from the borrower) interest payments on a predetermined schedule, distributing the received interest payments to funders based on their tokens, and periodically reevaluating the loan.

While the method steps disclosed in FIGS. 6(*a*) through 6(*c*) are shown in a certain sequence, as understood by a person of ordinary skill in the art (POSITA), the order of many of the steps can be changed. For example, the order of Steps 608 and 610 can be reversed. In fact, the actions of Step 610 could be taken prior to the actions in Step 606. The same can be done with the actions in Steps 616, 618, and 620.

Also, depending on the granularity of the process, token generation and token recordation could be considered a single step in general. Moreover, Steps 626 through 638 could be viewed as a part of a single method step of generating and recording a DSPV 40 data structure, comprising a self-executing program that ties an asset-value token to financial-return tokens (return-interest tokens and governance tokens).

Figure 7:
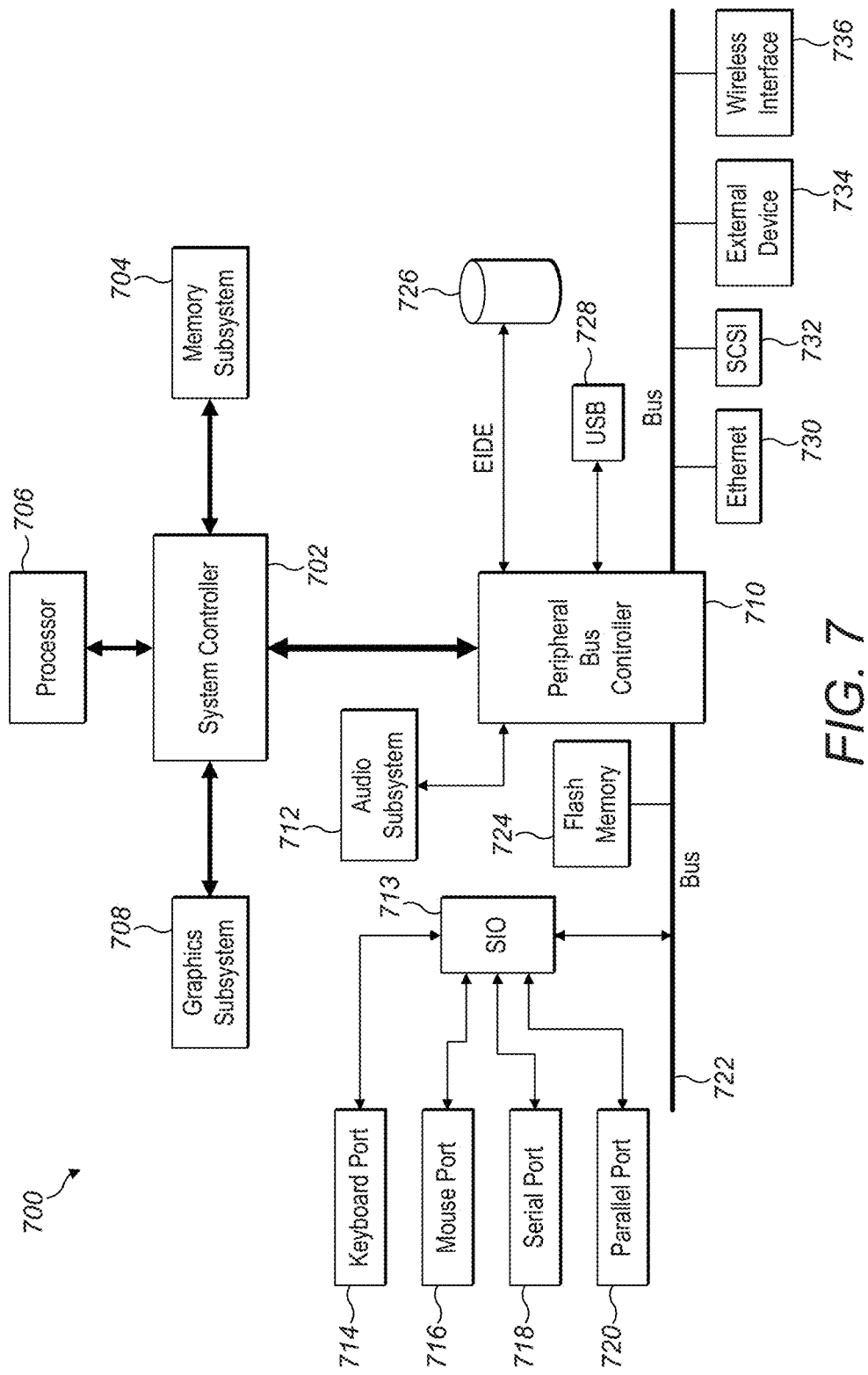
FIG. 7 shows a server in accordance with some embodiments of the invention.

FIG. 7 shows a server 700, whether asset-information server or asset-collateralization server, in accordance with an embodiment of the present invention. The server 700 includes a system controller 702 that is coupled to a memory subsystem 704, a processor 706, a graphics subsystem 708 and a peripheral bus controller 710. The peripheral bus controller 710 may be coupled to some elements directly and to other elements via a communication bus 722. For example, the peripheral bus controller may be coupled directly to a memory 726 via an enhanced integrated drive electronics (EIDE) interface, to a USB interface port 728, and to an audio subsystem 712. At the same time, the bus 722 may couple the peripheral bus controller 710 to a super input/output (SIO) circuit 713, flash memory 724, Ethernet port 730, a small computer system interface (SCSI) 732, an external device 734, and a wireless interface 736, such as WiFi, Bluetooth, cellular, etc. The SIO circuit 713, in turn, may be coupled to a keyboard port 714, a mouse port 716, a serial interface port 718, and a parallel interface port 720.

Exemplary embodiments may be applied to any processor-controlled device operating in the wired or radio-frequency domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. The servers may have network interfaces to the various communications networks, thus allowing transmittal and retrieval of information. The information may be received as packets of data according to a packet protocol (such as the Internet Protocol). The packets of data contain bits or bytes of data describing the contents, or payload, of a message. A header of each packet of data may contain routing information identifying an origination address and/or a destination address.

The present invention can operate with escrow bots that function as self-executing digital programs that release/loan digital funds when required conditions, such as third party and crowdsourced data from a variety of sources, are met. These sources can be mobile phone, social media, and Internet-of-Things sensors.

While the foregoing descriptions disclose specific values, any other values may be used to achieve similar results. Furthermore, the various features of the foregoing embodiments may be selected and combined to produce numerous variations of improved systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded as illustrative rather than restrictive, and all such modifications are intended to be included within the scope of present teachings.

Moreover, in this document, relational terms such as first and second, top and bottom, and the like may be used solely to distinguish one entity or action from another entity or action without necessarily requiring or implying any such specific relationship or order between such entities or actions. The terms "comprises," "comprising," "has", "having," "includes", "including," "contains", "containing" or any other variation thereof, are intended to cover a non-exclusive implementation, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An automated method of collateralizing an illiquid asset, the method comprising the steps of:

receiving, by a first server, an electronic document comprising a digital representation of the illiquid asset, the digital representation identifying a financial interest in the illiquid asset by a borrower;

hashing, by the first server, the digital representation of the illiquid asset to generate a first hash value;

recording, by the first server, the first hash value on a first blockchain;

storing, by the first server, the digital representation of the illiquid asset at a first memory location;

generating, by the first server, an asset-information table that associates a location of the first hash value on the first blockchain with the first memory location;

receiving, by the first server, an asset-valuation data concerning the illiquid asset;

storing, by the first server, the asset-valuation data at a second memory location;

hashing, by the first server, the asset-valuation data to generate a second hash value;

recording, by the first server, the second hash value on the first blockchain;

updating, by the first server, the asset-information table to associate a location of the second hash value on the first blockchain with the second memory location;

generating, by a second server, an asset-value token comprising an association with the updated asset-information table;

recording, by the second server, the asset-value token on a second blockchain;

determining, by the second server, an amount of digital currency for an automated digital transaction based on a programmed set of rules using the asset-value as a parameter;

generating, by the second server, a data structure comprising a self-executing digital program for performing the automated digital transaction, the data structure including the asset-value token; and recording the data structure on the second blockchain;

wherein the automated digital transaction involves loaning the amount of digital currency at a rate of interest determined using the programmed set of rules, and wherein the illiquid asset, via the asset-value token, constitutes a collateral for the amount of digital currency being loaned.

2. The method of claim 1, further comprising a step of periodically updating at least one of the digital representation of the illiquid asset and the asset-valuation data of the illiquid asset after the amount of digital currency has been loaned.

3. The method of claim 2, wherein the step of periodically updating at least one of the digital representation of the illiquid asset and the asset-valuation data of the illiquid asset after the amount of digital currency has been loaned comprises updating the asset-information table.

4. The method of claim 1, wherein the step of generating a data structure comprises generating a financial-return token.

5. The method of claim 4, further comprising a step of having the second server provide access to the asset-information table, in the first server, to an entity possessing the financial-return token.

6. The method of claim 4, wherein the financial-return token is selected from a set comprising a return-interest token and a governance token.

7. The method of claim 6, wherein the return-interest token is selected from a set comprising a senior return-interest token and a subordinate return-interest token.

8. The method of claim 1, wherein the first blockchain and the second blockchain are one and the same.

9. A system for performing a collateralized loan transaction, comprising:
- a first server including a first hardware processor and configured to:
  - receive an electronic document comprising a digital representation of an illiquid asset, the digital representation identifying a financial interest in the illiquid asset by a borrower;
  - hash the digital representation of he illiquid asset to generate a first hash value;
  - record the first hash value on a first blockchain;
  - store the digital representation of the illiquid asset at a first memory location;
  - generate an asset-information table that associates a location of the first hash value on the first blockchain with the first memory location;
  - receive an asset-valuation data concerning the illiquid asset;
  - store the asset-valuation data at a second memory location;
  - hash the asset-valuation data to generate a second hash value;
  - record the second hash value on the first blockchain; and
  - update the asset-information table to associate a location of the second hash value on the first blockchain with the second memory location; and
- a second server, communicatively coupled to the first server, the second server including a second hardware processor and configured to:
  - generate an asset-value token comprising an association with the updated asset-information table;
  - record the asset-value token on a second blockchain;
  - determine an amount of digital currency for an automated digital transaction based on a programmed set of rules using the asset-value as a parameter;
  - generate a data structure comprising a self-executing digital program for performing the automated digital transaction, the data structure including the asset-value token; and
  - record the data structure on the second blockchain, wherein the automated digital transaction involves loaning the amount of digital currency at a rate of interest determined using the programmed set of rules, and wherein the illiquid asset, via the asset-value token, constitutes a collateral for the amount of digital currency being loaned.

10. The system of claim 9, wherein the first server is further configured to periodically update at least one of the digital representation of the illiquid asset and the asset-valuation data of the illiquid asset.

11. The system of claim 10, wherein the first server is further configured to periodically update the asset-information table.

12. The system of claim 9, wherein the second server is further configured to generate a financial-return token.

13. The system of claim 12, wherein the second server is further configured to provide access to the asset-information table in the first server to an entity possessing the financial-return token.

14. The system of claim 12, wherein the financial-return token is selected from a set comprising a return-interest token and a governance token.

15. The system of claim 14, wherein the return-interest token is selected from a set comprising a senior return-interest token and a subordinate return-interest token.

16. The system of claim 9, wherein the first blockchain and the second blockchain are one and the same.

17. An automated method of collateralizing an illiquid asset, the method comprising the steps of:
- hashing, by a first server, a received digital representation of the illiquid asset to generate a first hash value, the digital representation identifying a financial interest in the illiquid asset by a borrower;
- recording, by the first server, the first hash value on a first blockchain;
- storing, by the first server, the digital representation of the illiquid asset at a first memory location;
- generating, by the first server, an asset-information table that associates the first hash value on the first blockchain with the first memory location;
- receiving, by the first server, an asset-valuation data;
- storing, by the first server, the asset-valuation data at a second memory location;
- hashing, by the first server, the asset-valuation data, to generate a second hash value;
- recording, by the first server, the second hash value on the first blockchain;
- updating, by the first server, the asset-information table to associate the second hash value with the second memory location;
- generating, by a second server, an asset-value token comprising an association with the updated asset-information table;
- recording, by the second server, the asset-value token on a second blockchain;
- determining, by the second server, an amount of digital currency for an automated digital transaction based on a programmed set of rules using the asset-value as a parameter;
- generating, by the second server, a data structure comprising a self-executing digital program for performing the automated digital transaction, the data structure including the asset-value token; and
- recording the data structure on the second blockchain;

wherein the automated digital transaction involves loaning the amount of digital currency at a rate of interest determined using the programmed set of rules, and wherein the illiquid asset, via the asset-value token, constitutes a collateral for the amount of digital currency being loaned.

18. The method of claim 17, further comprising a step of periodically updating at least one of the digital representation of the illiquid asset and the asset-valuation data of the illiquid asset after the amount of digital currency has been loaned.

19. The method of claim 18, wherein the step of periodically updating at least one of the digital representation of the illiquid asset and the asset-valuation data of the illiquid asset after the amount of digital currency has been loaned comprises updating the asset-information table.

20. The method of claim 17, wherein the step of generating a data structure comprises generating a financial-return token.

21. The method of claim 20, further comprising a step of having the second server provide access to the asset-information table, in the first server, to an entity possessing the financial-return token.

22. The method of claim 20, wherein the financial-return token is selected from a set comprising a return-interest token and a governance token.

23. The method of claim 17, wherein the first blockchain and the second blockchain are one and the same.

\* \* \* \* \*